United States Patent
Alamdar et al.

(10) Patent No.: US 12,469,224 B2
(45) Date of Patent: Nov. 11, 2025

(54) PROJECTOR ASSISTED AUGMENTED REALITY, ADJUSTING AR SIZE, SHAPE AND PRESENTATION BASED ON REAL WORLD SPACE

(71) Applicant: Sony Interactive Entertainment Inc., Tokyo (JP)

(72) Inventors: Hadi Alamdar, San Mateo, CA (US); Andrew Young, San Mateo, CA (US); Todd Tokubo, San Mateo, CA (US)

(73) Assignee: Sony Interactive Entertainment Inc., Tokyo (JP)

(*) Notice: Subject to any disclaimer, the term of this patent is extended or adjusted under 35 U.S.C. 154(b) by 328 days.

(21) Appl. No.: 17/535,522

(22) Filed: Nov. 24, 2021

(65) Prior Publication Data

US 2023/0162448 A1    May 25, 2023

(51) Int. Cl.
*G06T 19/00* (2011.01)
*A63F 13/52* (2014.01)
(Continued)

(52) U.S. Cl.
CPC .......... *G06T 19/006* (2013.01); *A63F 13/52* (2014.09); *G06T 3/40* (2013.01); *G06T 7/70* (2017.01); *A63F 2300/8082* (2013.01)

(58) Field of Classification Search
None
See application file for complete search history.

(56) References Cited

U.S. PATENT DOCUMENTS 11,126,320 B1 * 9/2021 Thompson ............ G06F 3/0482
2013/0328762 A1 12/2013 McCulloch et al.
(Continued)

FOREIGN PATENT DOCUMENTS

JP    2012168798 A    9/2012
JP    2019532382 A    11/2019

OTHER PUBLICATIONS

Bjones Brett R Brjones@Illinois Edu et al: IllumiRoom: Peripheral ProjectedExperiences, Human Factors in Computing Systems, ACM, 2 Penn Plaza, Suite 701 NEWUSA, Apr. 27, 2013 (Apr. 27, 2013), pp. 869-878, XP058601672, DOI: 10.1145/2470654.2466112978-1-4503-1899-0 * sections Illumiroom System, Color Augmentation, Texture Displacement,Connetion to Reality, Triggers *; figures 2, 3, 5, 6, 8, 12.
Partial Intl Search from Invitation to Pay Addl Fees;, PCT/US2022/049461, dated Feb. 20, 2023, 16 pages.
(Continued)

*Primary Examiner* — Jason T Yen
(74) *Attorney, Agent, or Firm* — Kilpatrick Townsend & Stockton LLP

(57) ABSTRACT

Methods and systems for normalizing views of real world space and virtual environment of an interactive application as viewed through a pair of augmented reality glasses include receiving content of the interactive application for rendering on a display screen of the pair of augmented reality glasses. The content is streaming content provided in response to inputs provided by the user and includes virtual objects. The virtual objects are dynamically scaled to match a scale of the real world objects to a scale of the virtual objects. The content of the interactive application dynamically scaled is projected as an overlay over the real world objects of the real world space viewed through the pair of augmented reality glasses. The content that is dynamically scaled enables a normalized view between the real world space and the virtual environment.

20 Claims, 15 Drawing Sheets

(51) Int. Cl.
  *G06T 3/40*    (2006.01)
  *G06T 7/70*    (2017.01)

(56) References Cited

U.S. PATENT DOCUMENTS

| | | | | |
|---|---|---|---|---|
| 2013/0328927 | A1* | 12/2013 | Mount | G06T 19/20 |
| | | | | 345/633 |
| 2017/0270715 | A1* | 9/2017 | Lindsay | G06T 7/60 |
| 2018/0218538 | A1 | 8/2018 | Short et al. | |
| 2020/0111256 | A1* | 4/2020 | Bleyer | G06F 3/011 |
| 2020/0394842 | A1* | 12/2020 | Baillard | G06T 19/006 |
| 2021/0154558 | A1* | 5/2021 | Travers | H04N 23/531 |
| 2021/0223551 | A1* | 7/2021 | Zannoli | G02B 27/0172 |
| 2021/0337341 | A1* | 10/2021 | Sakuma | H04S 1/007 |
| 2022/0122330 | A1 | 4/2022 | Short et al. | |
| 2022/0410011 | A1* | 12/2022 | Guzik | A63F 13/65 |
| 2023/0027801 | A1* | 1/2023 | Qian | G06T 19/006 |

OTHER PUBLICATIONS

Intl Search Report & Written Opinion, PCT/US2022/049461, dated Apr. 13, 2023, 18 pages.

* cited by examiner (Real world space and virtual space not normalized)

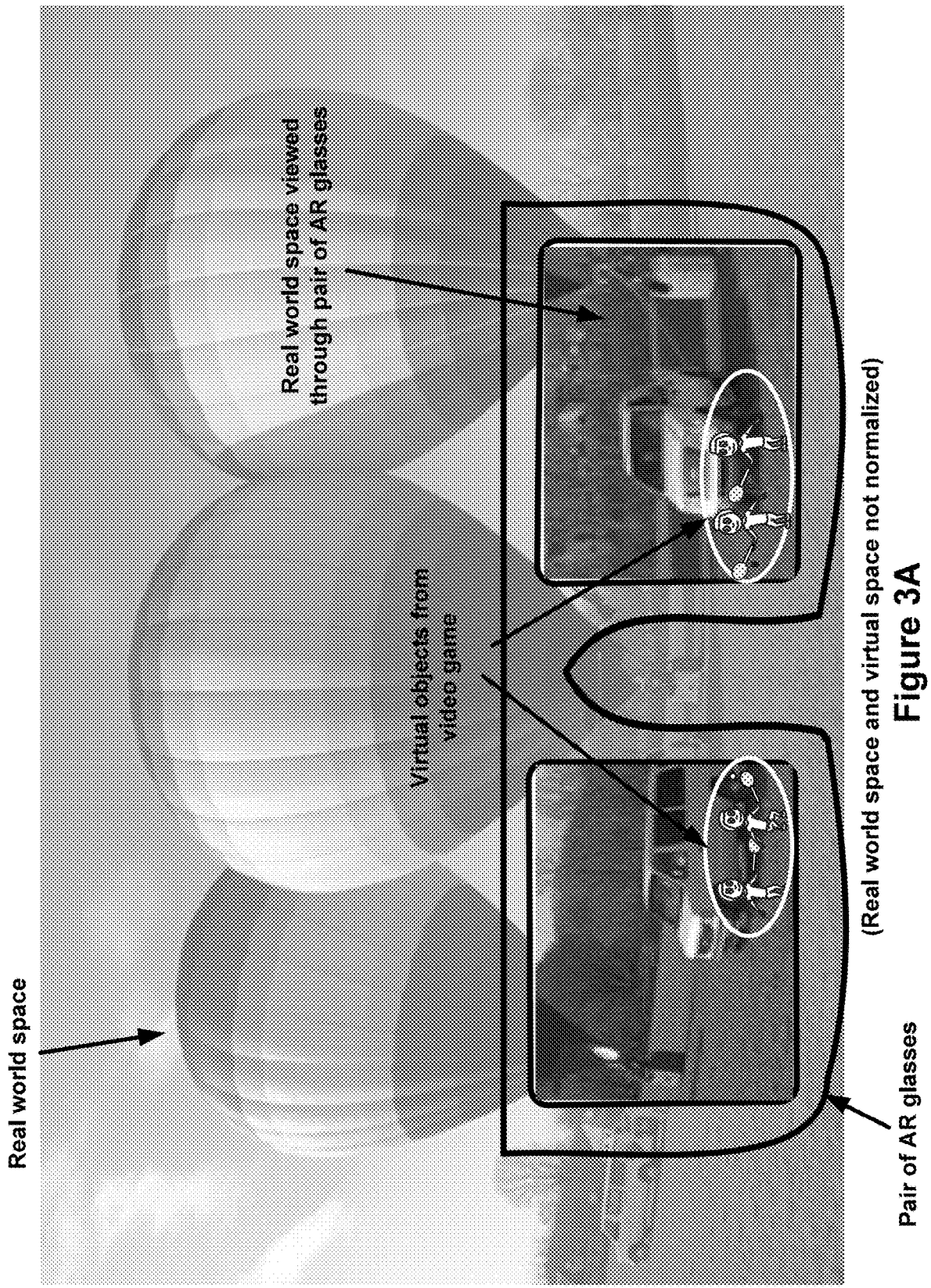

PROJECTOR ASSISTED AUGMENTED REALITY, ADJUSTING AR SIZE, SHAPE AND PRESENTATION BASED ON REAL WORLD SPACE

TECHNICAL FIELD

The present disclosure relates to normalizing view of content presented to users while interacting in an interactive application.

BACKGROUND OF THE DISCLOSURE

Playing video games and sharing media content from the gameplay has become mainstream. With the growing popularity of multi-player video games, social media applications, and other interactive applications, users are able to share and view media content simultaneously. The users may be co-located or remotely located. The gameplay and viewing of media content is done from within the confines of the users' own space and does not require the users to travel to a common venue.

Users may interact with a video game, for example, using wearable computing device, such as head mounted displays (HMDs), eyeglasses, etc., and watch gameplay content generated from the gameplay of the video game rendered on a display screen associated with the wearable computing device. To make interacting and viewing content easier and enjoyable, each user may have set up their wearable device so that they will be able to clearly view the gameplay content of the video game. This may include adjusting the optics of the wearable computing device in accordance to the user's visual characteristics or preferences, or adjusting images of the gameplay content to enable the user to discern the details of the image of the gameplay content rendered on the display screen. The amount of adjustment to the optics or images is done in accordance to the amount of details the user wishes to discern.

However, not all the users may have used the option to adjust the images or optics to view the images of the gameplay content. This may be due to lack of availability of options on their respective wearable computing device or lack of knowledge of the user. Even when the users have the option and/or the knowledge, the level of adjustment to the optics or image may not be same amongst all users. Especially, in a video gaming environment where users may be playing against each other, such mismatch in setup may result in some users having unfair advantage over other users during head-to-head competition against one another.

It is in this context that embodiments of the disclosure arise.

SUMMARY

Embodiments of the present disclosure relate to systems and methods for dynamically scaling objects viewed through a pair of wearable computing device. The pair of wearable computing devices may be a pair of smart eyeglasses or a head mounted display. The wearable computing device (or simply referred to henceforward as "wearable device") may be an augmented reality (AR) device that is used to view real world space in the vicinity of the user wearing the wearable device and also view content from an interactive application, such as a video game application, on a display screen associated with the AR device. The AR device may be communicatively connected to a local console or a server computing device of a cloud computing site that is used to execute the interactive application and provide content of the interactive application for rendering on the associated display screen. Alternately, the AR device itself may be executing the interactive application and providing content for viewing alongside the real world content of the real world space. The interactive application may be a multi-player video game or may be a single player video game or a multi-user interactive application. The content of the interactive application may be streamed over to the AR device (i.e., a client device) in response to inputs provided by the user(s). The content of the interactive application is provided as an overlay for rendering over the real world content that is being viewed by the user. The content of the interactive application or the real world content from the real world space may be dynamically scaled prior to rendering of the content of the interactive application as overlay. The dynamic scaling of the content of the real world space or the content of the interactive application is done so as to normalize the view between the content of the real world space and the content of the interactive application. The content of the interactive application is considered to be virtual content (i.e., AR content).

In a video gaming environment where users may be playing against each other, normalization of the AR content will assist in normalizing gameplay for head-to-head competition between the users (i.e., players). The normalization avoids unfair advantages of a first user over a second user due to the first user having special sizes or characteristics of AR content in their game or real world space, as viewed through their AR glasses as opposed to the second user. In some implementations, the AR content may be scaled to match to a scale of the real world objects in the real world space. Alternately, the real world objects in the real world space may be dynamically scaled as viewed through the AR glasses. In addition to scaling size of the objects (real world or virtual objects), the various implementations may also be extended to scale sound coming from or received by the AR content, so that the sound is normalized in context of the AR content (i.e., gameplay content) being viewed by the user(s).

In some implementations, where the interactive application is a video game, the video game may be played between two players and the dynamic scaling of the content allows for normalizing the real world spaces of the two players. For example, if a first real world space (e.g., a first living room) in the vicinity of a first player is shared with a second player and a second real world space (e.g., a second living room) in the vicinity of the second player is shared with the first player, the dynamic scaling allows for normalizing spaces and dimensions of the first and second real world spaces of the first and the second players shared with one another, to be normalized to each other. The dynamic scaling, in this example, ensures that each player is provided with an even playing field and that one player does not have an unfair advantage over another player for the video game (or any other interactive application) played between the two players. Further, the dynamic scaling of the real world objects to match a scale of the virtual object or vice versa assists in bringing in an accurate blend of the virtual world and the real world, while avoiding difficulties associated with unfair advantages that a first user has over a second user based on the first user's real world settings or their positioning in their real world scene.

In one implementation, a method is disclosed. The method includes receiving content of an interactive application for rendering on a display screen of a pair of augmented reality (AR) glasses worn by a user. The pair of AR glasses is used to view real world space in a vicinity of the user. The content is provided by the interactive application in response to inputs provided by the user and one or more other users during interaction with the interactive application. The content includes virtual objects. The virtual objects of the content of the interactive application are dynamically scaled to match to a scale of real world objects in the real world space viewed through the pair of AR glasses. The scaled content of the interactive application is presented as an overlay over the real world objects of the real world space viewed through the pair of AR glasses. The scaling allows a normalized view of the interactive content when viewed alongside the real world objects, for the user.

In one implementation, scanned images of the real world space in the vicinity of the user are received and are analyzed to identify a layout of the real world objects in the real world space and to determine attributes of the real world objects. The attributes of the real world objects are used to determine a scale of the real world objects in the real world space as viewed through the pair of AR glasses. Images of the virtual objects included in the content of the interactive application are projected as an overlay over the real world objects. The images of the virtual objects are dynamically adjusted to match the scale of the virtual objects to the scale of the real world objects in the real world space as viewed through the pair of AR glasses.

In one implementation, the scanned images are received from a scanner in response to a first signal to scan the images of the real world space and wherein the images of the virtual objects are dynamically adjusted using a projector in response to a second signal. The first signal and the second signal are triggered by machine learning algorithm in response to receiving content of the interactive application for rendering on the display screen of the pair of AR glasses. The machine learning algorithm analyzes the scanned images received in response to the first signal and generates the second signal to project the images, dynamically adjusted, over the real world objects.

In one implementation, the attributes of each real world object determined from analyzing the scanned images include at least a position in the real world space, position in relation to another real world object, position in relation to the user interacting in the real world space, size of the real world object, and rendering distance of the real world object when viewed through the pair of AR glasses.

In one implementation, presenting the scaled content further includes filtering out one or more virtual objects from the content prior to rendering the scaled interactive content. The filtering enables viewing of the scaled interactive content alongside the real world space through the pair of AR glasses.

In one implementation, presenting the scaled content includes providing a visual indicator that is indicative of presence of the one or more virtual objects included in the overlay.

In one implementation, the dynamic scaling further includes scaling sound emanating from one or more virtual objects included in the interactive content. The dynamic scaling of the sound is performed based on context of the interactive content.

In one implementation, the interactive application is a video game played between two players who are remotely located and the content is gameplay content.

In one implementation, the dynamic scaling includes scaling the game play content in context of real world objects in vicinity of a first player prior to overlaying the game play content over the real world objects viewed through a first pair of AR glasses of the first player, and scaling the game play content in context of real world objects in vicinity of a second player prior to overlaying the game play content over the real world objects viewed through a second pair of AR glasses of the second player.

In one implementation, the dynamic scaling includes scaling the game play content in context of real world objects in vicinity of a first player prior to overlaying the gameplay content over the real world objects viewed through a first pair of AR glasses of the first player, and, scaling the gameplay content in context of real world objects in vicinity of a second player prior to overlaying the gameplay content over the real world objects viewed through a second pair of AR glasses of the second player.

In one implementation, a real world object from a first real world space in vicinity of the first player is detected as selected by the first player for inclusion as a first virtual object and a second real world object from a second real world space in vicinity of the second player is detected as selected by the second player for inclusion as a second virtual object. The first virtual object is dynamically scaled to match a scale of first real world objects viewed by the first player via a first pair of AR glasses, and the second virtual object is dynamically scaled to match a scale of second real world objects viewed by the second player.

In one implementation, the scaled first virtual object is presented as an overlay over the first real world space viewed via first pair of AR glasses of the first player and the second virtual object is presented as an overlay over the second real world space viewed via a second pair of AR glasses of the second player. The first and the second virtual objects are rendered alongside the content of the interactive application and the dynamic scaling normalizes view of the selected first virtual object to the first real world space and the selected second virtual object to the second real world space.

In one implementation, the method includes detecting selection of a first real world object from a first real world space in vicinity of a first player for sharing with a second player, or detecting selection of a second real world object from a second real world space in vicinity of the second player for sharing with the first player. The first real world object is rendered as a first virtual object when rendered as an overlay over the second real world space and the second real world object is rendered as a second virtual object when rendered as an overlay over the first real world space. The dynamic scaling of the first virtual object is performed to match a scale of the real world objects in the second real world space viewed by the second player and dynamic scaling of the second virtual object is performed to match a scale of the real world objects in the first real world space viewed by the first player. The selection of the first virtual object for sharing is done by the first player and the selection of the second virtual object for sharing is done by the second player.

In one implementation, the dynamic scaling is done in response to a feedback provided by the user, or by a server executing the interactive application, or by the interactive application, or by a machine learning algorithm.

In one implementation, a method is disclosed. The method includes receiving content of an interactive application for rendering on a display screen of a pair of augmented reality (AR) glasses worn by a user. The content is provided by the interactive application in response to inputs provided by the user. The real world objects of real world space in a vicinity of user as viewed through the pair of AR glasses worn by the user, are dynamically scaled to match a scale of the real world objects to a scale of virtual objects included in the content of the interactive application. The virtual objects of the content of the interactive application are presented as an overlay over the scaled real world objects of the real world space viewed through the pair of AR glasses. The dynamic scaling provides a normalized view of the content in relation to the real world objects, for the user.

In one implementation, the dynamic scaling of the real world objects is performed by adjusting optics of the pair of AR glasses through which the user views the real world space.

In one implementation, the optics is adjusted in accordance to visual characteristics of the user viewing the real world space through the pair of AR glasses.

In one implementation, the virtual objects presented in the overlay are selectively filtered to remove one or more of the virtual objects included in the content prior to presenting the virtual objects over real world objects viewed through the pair of AR glasses.

In one implementation, a feedback to the user is generated requesting adjustment to a position of the user in the real world space relative to virtual objects of the content being provided as the overlay over the real world space viewed through the pair of AR glasses.

In one implementation, the interactive application is executed on a server of a cloud site. The feedback is generated as a signal from the server executing the interactive application, or as a suggestion from the interactive application or a machine learning algorithm executing on the server.

In one implementation, the interactive application is a multi-player video game played between a first player and a second player. The content of the interactive application includes gameplay content generated in response to inputs from the first and the second players.

In one implementation, the dynamic scaling of the real world objects includes scaling a first real world space viewed through a first pair of AR glasses of the first player to match a scale of a second real world space viewed through a second pair of AR glasses of the second player, the dynamic scaling normalizing a view of the first real world space in relation to the second real world space as viewed by the first and the second players. The scaling of the first real world space and the second real world space match the scaling of the virtual objects from the content of the interactive application presented as overlay over the respective first and second real world spaces.

In one implementation, presenting the virtual objects includes receiving selection of a first real world object in a first real world space from the first player or selection of a second real world object in a second real world space from the second player for inclusion in the first and the second real world spaces viewed by the first and second players, and rendering the first real world object as a first virtual object or the second real world object as a second virtual object as overlays over the first and second real world spaces viewed by the first and the second players. The first virtual object or the second virtual object is scaled to match scaling of the first and the second real world spaces prior to rendering alongside virtual objects of the gameplay content rendered on the pairs of AR glasses of the first and the second players.

In one implementation, the one or more virtual objects included in the gameplay content are filtered out prior to including as the overlay over the real world objects viewed by the first and the second players. An amount of filtering is defined to prevent cluttering on the display screen of the first and the second pair of AR glasses worn by the first and the second players.

In one implementation, a method is disclosed. The method includes, rendering gameplay content of a video game played between a first player and a second player on display screens of a first pair and a second pair of augmented reality (AR) glasses worn by the first player and the second player. The gameplay content is provided by the video game in response to inputs provided by the first and the second players. Real world objects included in a first real world space in a vicinity of the first player viewed through a first pair of AR glasses of the first player are dynamically scaled to match a scale of real world objects included in a second real world space in a vicinity of the second player viewed through a second pair of AR glasses of the second player. The dynamic scaling is to normalize a view of the first real world space viewed by the first player in relation to the second real world space viewed by the second player. The virtual objects included in the content of the video game are presented as an overlay over the scaled real world objects of the first real world space and the second real world space viewed through the pair of AR glasses of the first player and the second player, respectively.

In one implementation, the dynamic scaling of the real world objects is performed by adjusting optics of the first and the second pairs of AR glasses through which the first player and the second player view the first and the second real world spaces.

In one implementation, the optics is adjusted in accordance to visual characteristics of the user viewing the real world space through the pair of AR glasses.

In one implementation, the dynamic scaling includes scaling the gameplay content of the video game to match a scaling of the real world objects from the first real world space and the second real world space viewed by the first and second players, the dynamic scaling of the gameplay content performed prior to rendering as overlay over the real world objects of the first and the second real world space.

In one implementation, the virtual objects of the gameplay content are presented by dynamically filtering out one or more of the virtual objects of the gameplay content prior to rendering as overlay. An amount of filtering is defined to prevent cluttering on the display screens of the first and the second pair of AR glasses worn by the first and the second players.

Other aspects and advantages of the disclosure will become apparent from the following detailed description, taken in conjunction with the accompanying drawings, illustrating by way of example the principles of the disclosure.

BRIEF DESCRIPTION OF THE DRAWINGS

The disclosure may best be understood by reference to the following description taken in conjunction with the accompanying drawings.

FIG. 3A illustrates a display screen of a pair of augmented reality glasses worn by a user rendering an augmented reality image wherein size of the real world objects are rendered disproportionate to virtual objects from content of an interactive application, in accordance with one implementation.

DETAILED DESCRIPTION

Figure 1A:
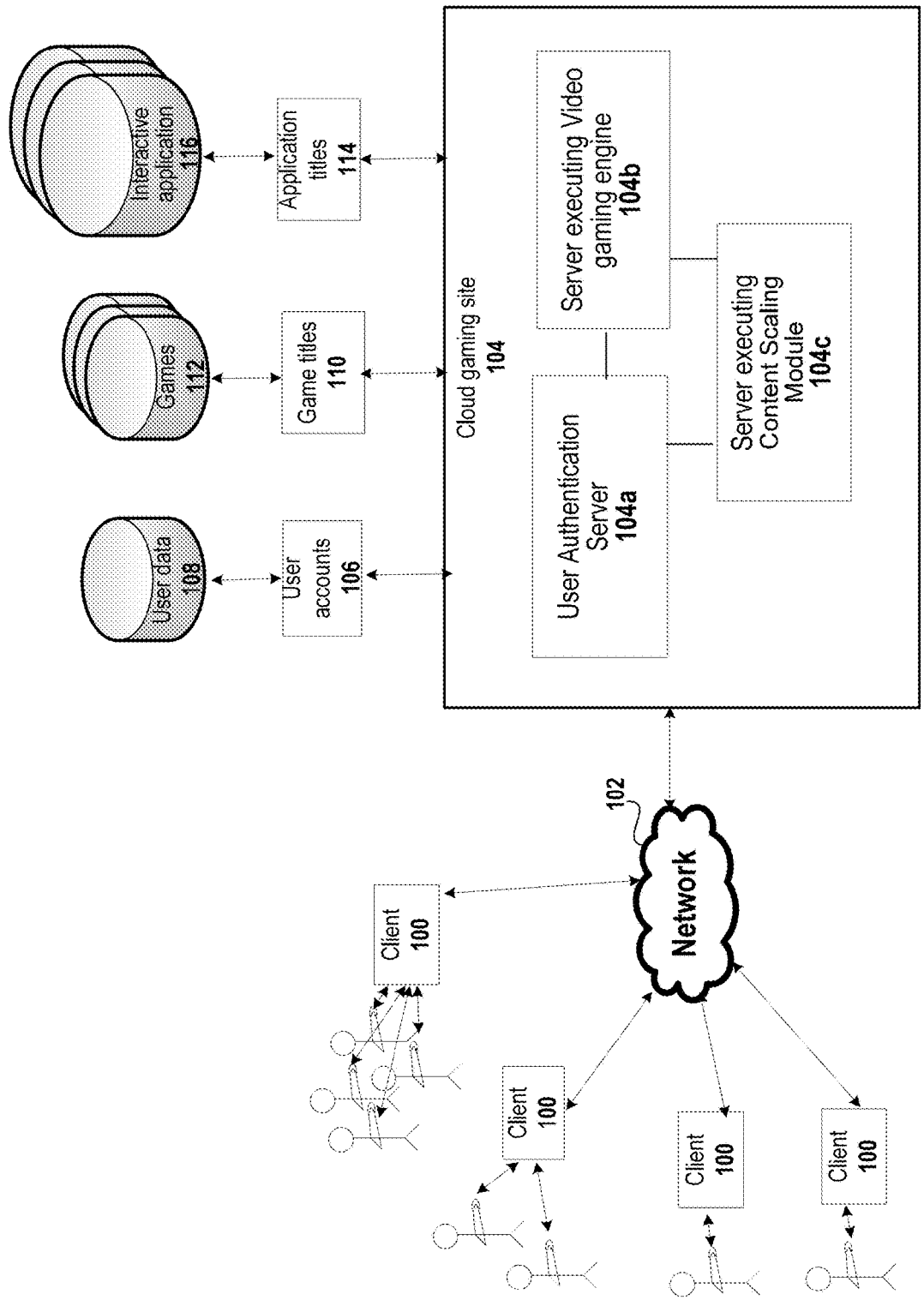
FIG. 1A illustrates an exemplary cloud gaming system used to access a video game that provides gameplay content alongside real world view viewed through a pair of AR glasses, in accordance with implementations of the disclosure

In the following description, numerous specific details are set forth in order to provide a thorough understanding of the present disclosure. It will be apparent, however, to one skilled in the art that the present disclosure may be practiced without some or all of these specific details. In other instances, well known process steps have not been described in detail in order not to obscure the present disclosure.

As more and more media content is being made available online, users are able to access the various media content and fully immerse in viewing and interacting with these media content. The users are able to view the media content even when the users are viewing the real world space using a pair of augmented reality (AR) glasses. The AR glasses assist the users to continue their experience of the real world space while keeping the users informed of state of the media content by allowing the media content to be presented alongside the real world space. The media content may be streaming media content generated from an interactive application that the users are interacting with or made available to the user by media content providers or other users. The streaming media content may include content of live private events (e.g., birthdays, anniversaries, trips, etc.), or live public events, such as a live game, live gameplay of a video game, live concert, live debate, etc., provided by media content provider or a user, or pre-recorded media content of past events (e.g., lectures, public or private events, video games, etc.) provided by content provider or a user, or pre-recorded media content (e.g., TV shows, movies, etc.) available for viewing and sharing. The interaction experience of the users may be further enhanced by interacting with an interactive application, such as a video game, individually or two or more players playing together or against one another individually or in groups and the online access allows the users to engage in such interactions from the confines of their own space, which may be co-located or remotely located. The interactions of the users may be in the form of inputs to the interactive application or comments related to the media content that the users are viewing or related to other users.

In the case of video games, the users use their own computing devices for viewing and interacting. These computing devices may be customized in accordance to the respective user's preferences. The customization may be done at the viewing level, such as customized display screen (e.g., large screen vs. small screen, multiple screens or single screen, etc.,), or at the space level (e.g., customized real estate space), in addition to the interactive input level (e.g., customized controller, customized input buttons, customized controls, etc.). The display screen may be part of a wearable computing device, such as a head mounted display (HMD) or pair of smart eyeglasses (e.g., pair of AR glasses), used for viewing virtual content or augmented reality (AR) content. The customized viewing and/or customized space from where a user interacts with the interactive application, such as video game, may provide an unfair advantage to the user over other users. For instance, in a gaming environment where a first player may be playing against a second player, when the first player has special sized or resolution display screen for viewing the media content (e.g., virtual or AR content) of the video game and/or real world objects of the real world space, the first player has an unfair advantage over the second player who may not have the enhanced display screen for viewing the same media content. The enhanced display screen may allow the first player to notice finer details in the media content or the real world space viewed through the pair of AR glasses, for example, and interact appropriately while the second player may not have that advantage. Similarly, the first player may have a larger real world space (e.g., large game room) to move around during interaction with the video game while the second player may have a smaller real world space (e.g., dorm room) to move around. Due to the mismatch in the sizes of the real world spaces of the first and the second players, the view of the real world space viewed through the pair of AR glasses of the first player may be larger than the view of the real world space viewed through the pair of AR glasses of the second player. As a result, the first player may be able to view lot more details of the real world space than the second player providing an unfair advantage to the first player over the second player.

In order to eliminate the unfair advantage of the first player over the second player and to normalize the real-world space and/or the AR content as viewed through the pairs of AR glasses, for example, of the first and the second players a system is designed to normalize the view of the virtual objects included in the media content of the video game (i.e., interactive application) as well as the real world objects from the real world spaces as viewed through the pairs of AR glasses of the first and the second players. In some implementations, the real world spaces in the vicinity of the two players who are remotely located are normalized. For instance, when a first player's living room is shared with the second player's living room, the spaces and dimensions of each player's living rooms are normalized to each other, so as to provide an even advantage to both the players for a video game played between the two players in shared real world spaces using AR content. The type of normalization provides an even playing field for both the players by avoiding difficulties associated with unfair advantage of one player over another based on their real world settings or positioning in their real world settings. In addition to normalizing views for the two players, the system may also normalize the virtual objects included in the media content (of the video game) that are to be placed over real world objects of the real world space viewed through the pair of AR glasses. The normalization may be done by scaling the virtual objects to match the scale of the real world objects in the real world space or scaling the real world objects to match the scale of the virtual objects viewed through the pair of AR glasses. This type of normalization avoids unfair advantage of one user who has special sizes or characteristics defined for the virtual content in their game or real world space viewed through the pair of AR glasses or the like (e.g., HMD), over another user. Instead of or in addition to normalizing the view of the virtual objects and/or real world objects seen through the pair of AR glasses, the system may also scale sound coming from the virtual content or received by the virtual content so that the sound is normalized for the interactive application in context of the game content or virtual objects viewed through the pair of AR glasses. The normalization may be done based on suggestions from a server executing a content scaling module, a video game (i.e., interactive application) or machine learning algorithm. The suggestions provided as feedback may take into consideration the current position of the user in the real world space and may also provide suggestions to best position the user in the real world space, best position a character associated with the user within the video game or the user in the real world space relative to the virtual content. In addition to normalizing the views between the virtual content and the real world space and between the real world spaces shared between two users so that the game played or activity performed by the two users in the shared real world spaces are at equal footing.

The normalization assists in bringing in an accurate blend of the virtual world and the real world for the user and for a plurality of users sharing their real world spaces with other users during game play of the video game, for example. Further, the normalization of the virtual world and the real world assists in providing normalized interaction experience for two users playing a video game (i.e., interactive application) from two different environments by providing an even playing field to the two users (i.e., equal in challenge). Scanners and/or other sensors may be used to scan the real world environment. The data provided by the scanners and other sensors may be analyzed to determine the layout of the real world space in which the users are interacting with the interactive application (e.g., video game) and to determine the attributes of the real world objects in the real world space. The attributes are used to determine a scale of the real world objects viewed through the pair of AR glasses. Based on the attributes, a projector is used to either scale the virtual objects to match to a scale of the real world objects or scale the real world objects to match to a scale of the virtual objects prior to the virtual objects being presented as an overlay over the real world objects viewed through the pair of AR glasses.

In some implementations, the dynamic scaling engine of a content scaling module may be used to generate a signal to the projector to scale the virtual objects prior to rendering them as overlay over real world objects viewed through the pair of AR glasses. In some implementations, a machine learning algorithm may be used to determine the layout and attributes of the real world objects identified in the real world space. In one implementation, the dynamic scaling engine may, in response to receiving the content, may initiate a first signal to scanners, image capturing devices and sensors that are available within or near the pair of AR glasses or computing device communicatively connected to the pair of AR glasses to capture images of the real world space in which the user is present. The images captured by the image capturing devices and sensors are forwarded to the machine learning algorithm, which analyzes the captured images to identify the layout and attributes of the real world objects. The layout and attributes of the real world objects are then used to determine a scale of the real world objects. Based on the scale of the real world objects, the dynamic scaling engine may generate a second signal to adjust a scale of the virtual objects from the content to match a scale of the real world objects determined from analyzing images of the real world space captured by image capturing devices and sensors. In some implementations, one or more real world objects may be selected and introduced as virtual objects alongside the virtual objects of the content of the interactive application. The virtual objects thus introduced may be scaled to match to the scale of the real world objects and the virtual objects as viewed through the pair of AR glasses prior to the introduction.

With the general understanding of the disclosure, specific embodiments will now be described with reference to the various drawings.

FIG. 1A illustrates a simplified block diagram of a system used to normalize views between the virtual objects and the real world objects of the real world space viewed through a pair of wearable computing devices, such as a pair of AR glasses, in one implementation. It should be noted that the various implementations have been described by making reference to a pair of AR glasses as the wearable computing device used to view the real world objects in the real world space and the virtual objects of an interactive application. However, the implementations may be extended to include other wearable computing devices, such as head mounted displays (HMDs) or the like.

The system includes a plurality of client devices 100 operated by a plurality of users accessing a cloud gaming site 104 through a network 102, such as the Internet. The users may be co-located or remotely located and accessing the cloud gaming site 104 over the Internet from one or more geo locations. The client devices 100 are communicatively connected to the cloud gaming site through wired or wireless means. The cloud gaming site 104 may include a plurality of servers distributed across a plurality of data centers. The plurality of servers provide the necessary resources to host one or more interactive applications that authenticate the user, instantiate one or more interactive applications that provide the necessary media content for rendering on the client devices 100 of users, and normalize the views between the real world content and the virtual content included in the media content when rendered on a display screen of the client devices (e.g., HMDs, pair of AR glasses, etc.).

For instance, a server 104a of the cloud gaming site 104 may be used to perform user authentication prior to providing access to the interactive application to the client devices 100. Server 104b may include one or more consoles (e.g., game consoles—not shown) with each console configured to execute one or more instances of one or more video games or interactive applications. Alternately, server 104b may be configured to execute one or more instances of one or more interactive applications. The server 104b may be a single server or may represent a plurality of servers with each server providing necessary resources to execute an instance of the one or more interactive applications. Alternately, each one of the plurality of servers may provide specific resource(s) for executing the interactive application and one of the plurality of servers may coordinate the resources for successful execution of the interactive application. One or more servers 104c of the cloud gaming site 104 may execute an instance of the content scaling module that is used to normalize the views between the real world objects in the real world space and the virtual objects included in the media content of the interactive application viewed through pairs of AR glasses of the users. In one implementation, the client devices 100 of users may be separate computing devices used to provide inputs to the interactive application and the media content may be provided to the client devices 100 for viewing through pairs of AR glasses of the users. In this implementation, each pair of AR glasses may be communicatively connected to the respective client device 100 of a user via wired or wireless connections, wherein the client device is located locally in the real world space or proximate to the real world space of the user and communicatively connected to the cloud gaming site 104 via the network 102 (such as the Internet). In an alternate implementation, the pairs of AR glasses may themselves be the client devices 100 that are used to provide inputs to the interactive application executing on one or more servers of the cloud gaming site 104. In such implementations, the pairs of AR glasses are communicatively connected to the servers on the cloud gaming site 104 over the Internet.

Even though different servers (104a-c) are shown to perform different services, it should be noted that all or combination of the services (authentication, execution of interactive application and execution of content scaling module) may be performed by a single server. The user authentication server 104a may interact with user data database 108 to access the user accounts 106 contained therein to authenticate the users of the client devices 100 that are requesting access to a video game executing on server 104b. The user account 106 may include biometric data and other authentication data that are used to authenticate the users. Upon successful authentication of the users, access is provided to the users to select the video game for gameplay or view gameplay.

Upon successful user authentication of a user and in response to request selecting a video game for gameplay by the user, the server 104b may access the game titles 110 stored in the games database 112 to authenticate the request of the user. The game database 112 maintains the list of games titles 110 that are available at the cloud gaming site and a list of games that each user is eligible to access, either through paid membership/subscription or via access granted by the game developer or game host. Once the request for access is authenticated by the server 104b, the user is provided access to an instance of the video game by executing the game code of the video game on the server 104b. In this case, the server 104b may be a stand-alone server that is capable (i.e., has resource capabilities) of storing game codes of a plurality of video games and executing an instance of the video game, in response to the request. Alternately, the server 104b may access and retrieve the game code from a video game stored on a different server and instantiate the video game using the resources of the server 104b and generate video content stream (i.e., gameplay data) during gameplay of the video game. The generated gameplay data is compressed using compression techniques of an encoder available to the server 104b and transmitted to the client devices 100 over the network 200 as streaming frames of game data.

In one implementation, the video game may be a multiplayer video game accessed by a plurality of users for game play, wherein the plurality of users may be distributed across multiple geolocations. In this implementation, the game code of the video game may be instantiated on a plurality of servers (e.g., cloud servers) 104b distributed across multiple data centers. In some implementations, the data centers where the video game may be instantiated may be identified at geolocations of the one or more users or at least proximate to the one or more users so as to provide gameplay data with minimal latency. When instantiated on a plurality of cloud servers 104b, the gameplay data generated for the video game is synchronized across the plurality of cloud servers 104b and forwarded as media content to the client devices 100 of users. In another implementation, the server 104b may be configured to manage one or more virtual machines that is capable of executing an instance of the video game to provide the data stream of gameplay, wherein the streaming may be done in real-time or delayed time. Other types of cloud servers may include blade servers. The inputs provided by the users through their client devices 100 are used to update a game state of the video game and generate updated gameplay data. The updated gameplay data is streamed to the users as frames of gameplay data.

A video gaming engine executing on the server 104b (e.g., cloud server or stand-alone server or game console) is communicatively connected to game logic of the video game to provide a framework for the video game. The game engine is a software layer that serves as a foundation for the video game and provides the basic infrastructure (i.e., framework) for developing the video game. The game engine abstracts the details of doing common related tasks (i.e., game engine tasks) required for every video game, while the game code of the video game provides game logic detailing how the video game is to be played. The game code of the video game uses the modules included in the game engine to control virtual objects including virtual characters and virtual scenes within the video game and to generate gameplay data. Some of the basic core modules of the game engine used by the game code of any video game includes a physics engine (for collision detection, collision response, trajectory, movement of object based on gravity, friction, etc.), a rendering engine (i.e., a renderer) for 2D and 3D graphics, sound engine, scripting, animation, artificial intelligence, threading, networking, streaming, memory management, scene graphics, etc. These basic core modules of the game engine are reusable by different video games to generate gameplay data based on game state of the video game. The generated gameplay data includes animation provided by the different virtual characters, wherein the animation is based on the context of the video game used in generating the gameplay data.

The client devices 100 of users communicatively connected to the server 104b over the network 102, receive the frames of gameplay data, decompresses the gameplay data, and render it on a display screen associated with the client device. The display screen of the client device of each user may be configured for view of real world space while having the ability to interact with the gameplay data. Each client device (100) has a processor, memory and communication capabilities to access the network 102 using wired, wireless, or 4G/5G communication, etc., and may be portable or not portable. The client devices 100 may run an operating system and include network interfaces or could be thin clients with network interface to access the network (Internet) 102 in order to communicate with the server 104b, wherein the server 104b provides the computation functions. The network 102 can be a 3G, 4G or 5G networks.

The client devices 100 having 5G communication capabilities are capable of connecting to 5G networks. In one implementation, the 5G networks are digital cellular networks, where the service areas are divided into a plurality of "cells" (i.e., small geographical areas). Analog data generated at the mobile devices are digitized and transmitted as radio waves to a local antenna within a cell using frequency channels that can be reused in geographically separated cells. The local antenna is connected to Internet and telephone network by a high bandwidth optical fiber or other similar wireless communication. The 5G networks are capable of transmitting data at higher data rates as they use higher frequency radio waves for communication and, as a result, provide lower network latency.

In alternate implementation, the media content may be provided by a media content provider hosted on a server that is separate from the server 104b that is used to store game code and execute the video game. The media content may be related to a live event (e.g., live game, live concert, live debate, live video capture of an event, etc.,) or a pre-recorded event and may be streamed or otherwise provided to the client devices 100 for rendering. The media content may be generated by the media content provider and transmitted to the client devices, or may be generated by another user and transmitted using the resources available to the media content provider to the client devices of users. As with the gameplay data of the video game, the display screen associated with the client devices of users rendering the media content provided by the media content provider may be configured to provide augmented reality experience to the user by allowing the user to view the real world space in the vicinity of the user while rendering the media content alongside a view of the real world objects of the real world space.

The display screen may be part of a pair of AR glasses worn by the user and the client device may be the pair of AR glasses or a computing device that is communicatively connected to the pair of AR glasses of each user. The media content that is rendered alongside the real world objects may be dynamically scaled using the content scaling module executing on the server 104c so as to match to a scale of the real world objects or alternately the real world objects viewed through the pair of AR glasses may be dynamically scaled to match to a scale of the virtual objects included in the media content prior to the media content being rendered alongside the real world objects of the real world space. The dynamic scaling provides normalized views between the real world object and the virtual objects included in the media content.

Figure 1B:
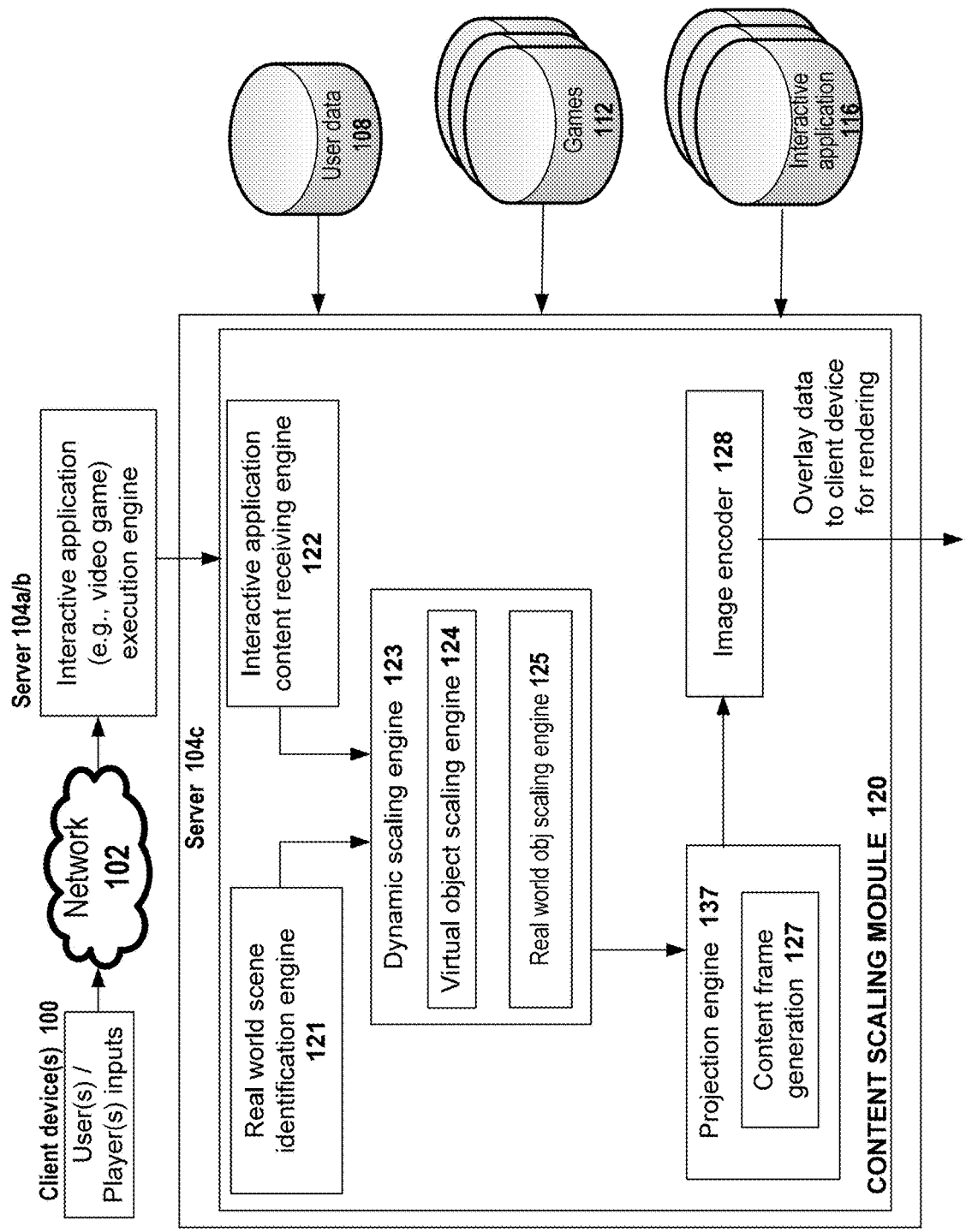
FIG. 1B illustrates a simplified block diagram of different sub-modules of a content scaling module used for normalizing images viewed through a pair of augmented reality (AR) glasses worn by a user, in accordance with one implementation of the present disclosure.

FIG. 1B illustrates a simplified block diagram of different sub-modules included in a content scaling module 120 used for normalizing the views between the real world objects and the virtual objects of the media content viewed through a pair of AR enabled eyeglasses, in one implementation. The content scaling module 120 is shown to be executed on server 104c. However, the content scaling module may be executed on any server at the cloud gaming site including the server 104a that is used to authenticate the users or the server 104b that is executing an instance of the video game. Some of the sub-modules included in the content scaling module 120 include a real world scene identification engine 121, interactive application content receiving engine 122, dynamic scaling engine 123, content frame generation engine 127 and image encoder 128. The sub-modules identified are provided as a mere example and should not be considered restrictive. Fewer or additional sub-modules may be included in the content scaling module 120. In some implementations, the content scaling module 120 may be executed on a computing device that is local to the pair of AR glasses or by the processor available in the pair of AR glasses.

The real world scene identification engine 121 is configured to obtain details of real world objects included in the real world space in the vicinity of the user as viewed through the pair of AR glasses. The details may be obtained using image capturing devices, scanners, sensors available on the pair of AR glasses, on a computing device or a controller communicatively connected to the pair of AR glasses or distributed in the real world space. The details of the real world objects are processed to determine a scale of the real world objects. The visual characteristics of a first user may be different from a second user. As a result, the scale of the real world objects viewed through the lenses of a first pair of AR glasses worn by the first user may be the actual scale of the real world objects while the scale of the real world objects viewed through the lenses of a second pair of AR glasses worn by the second user may have been adjusted in accordance to the visual characteristics of the second user. The processed information related to the scale of the real world objects are provided to the virtual object scaling engine 124. The virtual object scaling engine 124 uses the information to adjust the scaling of the virtual objects provided to the pair of AR glasses for rendering. Details of the processing of the real world objects viewed through the pair of AR glasses will be discussed in more detail with reference to FIG. 1C.

The interactive application content receiving engine 122 of the content scaling module 120 receives content from the interactive application, such as video game, generated by the interactive application execution engine. The content includes gameplay data that is updated in response to inputs provided by users/players through their respective client device(s) 100. The inputs from the users/players are used to adjust the game state of the video game and update content included in frames of gameplay data. The frames of gameplay data forwarded by the interactive application is processed by the interactive application content receiving engine 122 to determine the type of content that is received (e.g. streaming or non-streaming content, gameplay content or other interactive application, live or pre-recorded content, etc.), the amount of content, type of virtual objects included therein, location and orientation of the virtual objects, depth of the virtual objects, etc. The processed content of the interactive application (i.e., frames of gameplay data in the case of the video game) is provided to the dynamic scaling engine 123 for further processing.

The dynamic scaling engine 123 receives the processed input of the real world objects captured from the real world space and the virtual objects included in the content of the interactive application and dynamically scales the virtual objects of the content or the real world objects of the real world space prior to making them available for viewing through the pair of AR glasses. The dynamic scaling engine 123, in one implementation illustrated in FIG. 1B, may engage the virtual object scaling engine 124 to dynamically scale the virtual objects of the content that is being streamed by the video game application so that the scale of the virtual objects match the scale of the real world objects. In this implementation, the dynamic scaling engine 123 will determine the scale of the real world objects as viewed through the pair of AR glasses using the processed data obtained from real world scene identification engine 121 and use the processed data of the real world objects to determine a scale to which the virtual objects of the content that is being streamed by the video game (i.e., interactive application) have to be dynamically scaled prior to forwarding the content to the client device for rendering. The details related to scaling of the virtual objects are provided to the projection engine 137. The projection engine 137 uses the details to adjust the scaling of the images of the virtual objects of the content included in the frames and forward the frames of content with virtual objects adjusted to scale to the image encoder 128. As and when new content is streamed from the video game, the projection engine 137 dynamically scales the virtual objects contained within the new content in accordance to the scaling information provided by the dynamic scaling engine 123. The frames of scaled content are configured as an overlay and forwarded to an image encoder 128 for encoding using the encoding technique available within. The encoded frames of scaled content are then forwarded to the client device for rendering as overlay over the real world objects of the real world space that are being viewed through the pair of AR glasses. The scale of the virtual objects of the content rendered in the overlay match the scale of the real world objects viewed through the pair of AR glasses. In the implementation illustrated in FIG. 1B, the virtual objects are scaled in accordance to a scale of the real world objects as viewed through the pair of AR glasses. Instead of dynamically scaling the virtual objects of the content of the video game, real world objects viewed through the pair of AR glasses, in an alternative implementation, may be adjusted to match to a scale of the virtual objects. In one implementation, the virtual objects in the overlay may be highlighted or provide other visual indicators to let the user know of the presence of the virtual objects.

Figure 1C:
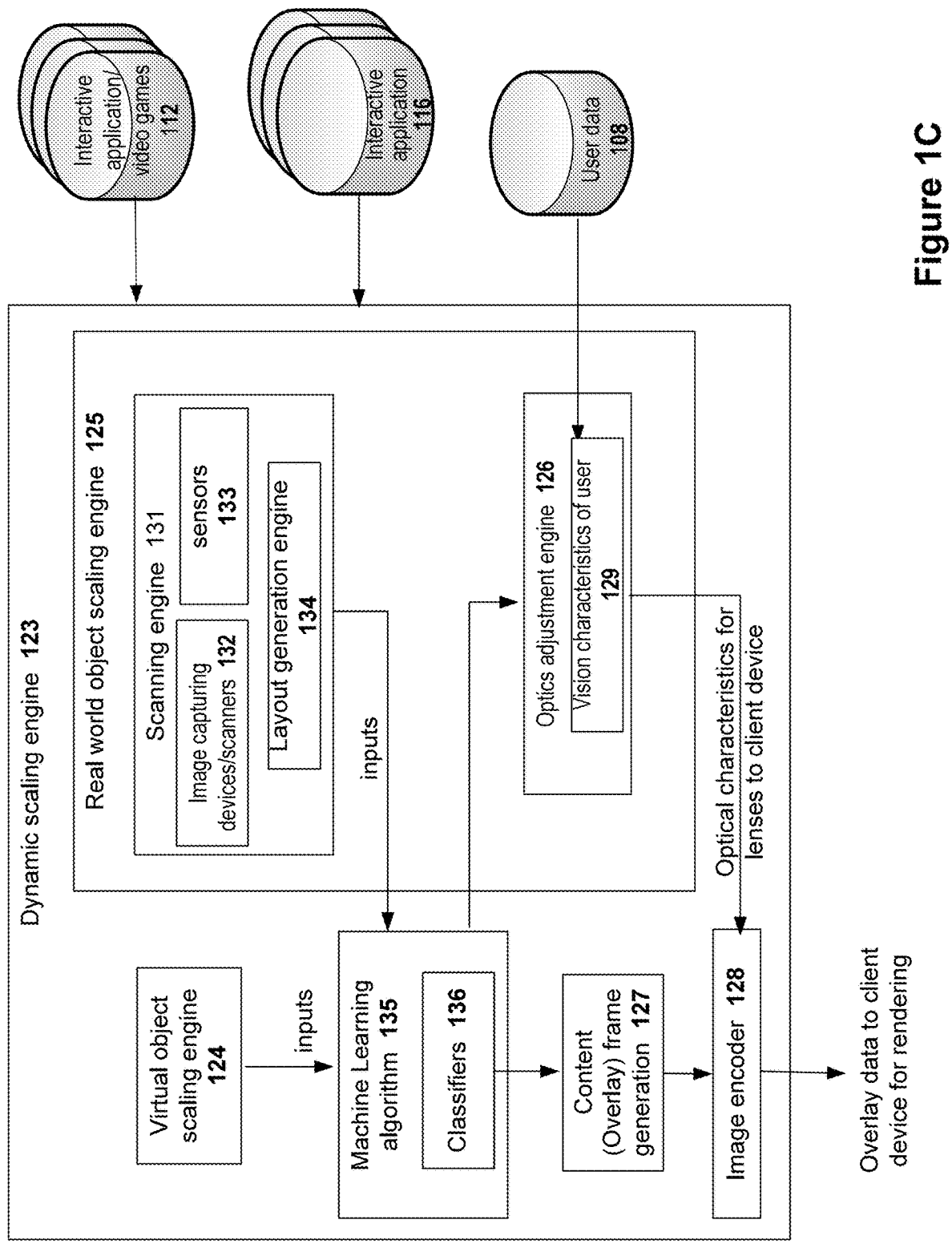
FIG. 1C illustrates a simplified block diagram of a dynamic scaling engine that is used to dynamically scale real world space as viewed through a pair of the AR glasses worn by the user as part of normalizing views of the real world space and the virtual environment provided by a video game, in accordance with one implementation of the present disclosure.

FIG. 1C illustrates the alternate implementation wherein the dynamic scaling engine 123 engages a real world object scaling engine 125 to dynamically adjust scaling of the real world objects of the real world space as viewed through the pair of AR glasses to match the scale of the virtual objects included in the content of the video game. In this implementation, the dynamic scaling engine 123 may obtain details of a scale of the virtual objects included in the content of the video game and then dynamically adjust the scaling of the real world objects to match the scale of the virtual objects. In one implementation, the real world object scaling engine 125 may engage an optics adjustment engine 126 to adjust the optical characteristics of the lenses of the pair of AR glasses so that the real world objects can be viewed through the pair of AR glasses at the scale that matches the scale of the virtual objects contained in the content of the video game. In one implementation, the optical characteristics of the lenses may be adjusted based on visual characteristics of the user. The visual characteristics data 129 of the user may be stored in the user data database 108 and made available to the optics adjustment engine 126 based on the user credentials provided during user authentication.

FIG. 1C illustrates additional sub-modules contained within the dynamic scaling engine 123 that can be used to scale the real world objects of the real world space viewed through the pair of AR glasses. The scaling of the real world objects is to normalize views between the real world objects viewed through the pair of AR glasses and the virtual objects included in the content of the video game (i.e., interactive application). The dynamic scaling engine 123 may engage machine learning algorithm 135 to determine an amount of scaling that needs to be done to the real world objects or the virtual objects included in the content of the interactive application prior to rendering the virtual objects as an overlay over real world space viewed through the pair of AR glasses. A virtual object scaling engine 124 is engaged when the virtual objects included in the interactive application have to be dynamically scaled to match to a scale of the real world objects in the real world scene viewed through the pair of AR glasses. Similarly, real world object scaling engine 125 is engaged when the real world objects have to be dynamically scaled to match to a scale of the virtual objects of the content of the video game, prior to presenting the virtual objects over the scaled real world objects. In one implementation, the dynamic scaling of the real world objects may be done using an optics adjustment engine 126.

In one implementation, when the real world objects have to be scaled, the dynamic scaling engine 123 sends a signal to the real world object scaling engine 125 to initiate scanning of the real world space in which the user is present and interacting with the interactive application. The real world object scaling engine 125, in response to the signal from the dynamic scaling engine 123, activates one or more image capturing devices and/or scanners (132), one or more sensors 133, including motion sensors, etc., to capture images and data related to the real world space in the vicinity of the user. The captured images are processed to identify data related to the real world space. The data related to the real world space is analyzed to identify the layout of the real world objects within the real world space and attributes of the real world objects. The one or more attributes of the real world objects identified from the analysis of the image data obtained from the image capturing devices (e.g., cameras) and scanners 132 may include, a geometry of the real world space in the vicinity of the user where the real world objects are disposed, a boundary of the real world space, location of the real world objects in the real world space, identity of the real world objects, location, direction and orientation of the real world objects in relation to other real world objects and in relation to user, size of the real world objects, rendering distance of the real world objects when viewed through the pair of AR glasses, etc. The data provided by the various sensors (including motion sensors) may be used to identify an amount of space available between the user and the different real world objects and between the real world objects, depth of the real world objects as viewed through the pair of AR glasses, etc. The amount of space between the real world objects and the user may vary based on the movement of the user in the real world space as the user is interacting with the interactive application, and the sensor data captured by the sensors 133 can be used to detect the changes in the location and orientation of the user in the real world space in relation to the real world objects and to compute the space between the real world objects and the user. The attributes of the real world objects are used to determine the scale of the real world objects as viewed through the pair of AR glasses. The attributes and other data related to the real world objects are provided to the machine learning algorithm 135 as input.

To assist in determining the scale of the real world objects, the dynamic scaling engine 123 engages the virtual object scaling engine 124. The virtual object scaling engine 124 analyzes the content from the interactive application to determine the various attributes of the virtual objects included in the content. In the video game application, the virtual objects are part of a virtual scene within the gaming environment and the various attributes of the virtual objects determined from the analysis of the content includes type of virtual object, number of virtual object of each type, identity of the virtual object, location and orientation of the virtual object in relation to a virtual character representing the user (if applicable) and in relation to other virtual characters (either representing other users or available within the gaming environment), location and orientation of the virtual object in relation to other virtual objects, depth of the virtual object, etc. The attributes of the virtual objects are used to determine the scale of the virtual objects included in the virtual scene of the content. The attributes and other data related to the content are provided to the machine learning algorithm 135 as input.

The layout generation engine 134 is configured to receive and analyze the data from the image capturing devices and/or scanners 132 and the sensors 133 to determine a layout of the real world space. In one implementation, the layout generation engine 134 is a separate module within the scanning engine 131. In an alternate implementation, the layout generation engine 134 may be part of the scanning engine 131. The data from the scanning engine 131 is provided as input to the machine learning algorithm 135, wherein the data includes images captured by the image capturing devices, scanners, data from sensors and layout details from the layout generation engine 134.

The machine learning algorithm 135 receives the attributes related to the virtual objects included in the content from the virtual object scaling engine 124, the attributes related to the real world objects and the layout data related to the real world space from the scanning engine 131. The inputs are classified using classifiers 136, wherein the classifiers 136 may include one or more attributes of the real world object and/or one or more attributes of the virtual objects. The machine learning algorithm then constructs an artificial intelligence (AI) model using the classifiers 136. AI model includes a plurality of nodes and edges defined between consecutive pair of nodes. Each node corresponds to one or more attributes of the real world objects and/or virtual objects, and the edge between any two consecutive nodes defines the relationship between the attributes contained within the nodes. Various outputs are generated by the machine learning algorithm 135 based on the different output goals for the content of the video game and for the real world space defined for the user. For example, an output goal may be defined to ensure that the user does not bump into real world objects. Another output goal may be to ensure that the user does not trip or fall. One other output goal may be to ensure that the user does not approach or cross a boundary of the real world space and if the user is approaching the boundary to guide the user away from the boundary and safely around the real world objects. Yet another output goal may be to determine scaling factor for different visual characteristics of the user. As additional content is received and additional attributes of the real world and virtual objects are identified, the AI model is continually trained to finely tune the output goals.

Based on the output goals defined for or by the user, the dynamic scaling engine 123 engages the optics adjustment engine 126 or the content frame generation engine 127 to adjust a scale of either the real world content or the virtual content. In one implementation, when the real world objects as viewed through the pair of AR glasses have to be dynamically scaled, the dynamic scaling engine 123 generates a signal to the optics adjustment engine 126. In response to the signal from the dynamic scaling engine 123, the optics adjustment engine 126 may adjust optics of lenses of the pair of AR glasses so that a size of the real world objects viewed through the pair of AR glasses are scaled to match to the scale of the virtual objects of the interactive application.

The optical characteristics of the lenses of the pair of AR glasses may be adjusted by the optics adjustment engine 126 by generating appropriate signals, based on the type of lenses used. The pair of AR glasses may be adjustable focus eyeglasses in that the focal length of the lenses may be varied by engaging electro-optical or opto-mechanical methods. In an implementation that uses electro-optical enabled pair of AR glasses, the lenses use liquid crystals as the liquid medium and the focal length of the lenses may be varied by changing the refraction of the liquid. Changes to the refraction characteristics of the liquid can be achieved by applying appropriate electric potential. In another implementation that uses opto-mechanical enabled pair of AR glasses, the lenses are made up of a combination of flexible and rigid lenses and a slider is provided to vary the focal length of the flexible lenses. In one implementation, the slider may be moved using signals provided by the optics adjustment engine 126. In another implementation, the lenses may implement liquid pressure against diaphragm. In this implementation, each lens is configured to enclose a reservoir of fluid silicone and the focal length can be varied by adjusting the level of fluid, which can be a either through electrical pulses or other means. The electrical pulses or other means for controlling the level of fluid can be initiated using signal(s) from the optics adjustment engine 126. The aforementioned ways or design of lenses for adjusting the focal length are provided as mere examples and should not be considered restrictive. Other designs of the lenses may also be engaged to adjust the optical characteristics of the lenses to enable dynamic scaling of the real world objects. Alternately, other ways of adjusting the scale of the real world objects viewed through the pair of AR glasses may also be envisioned.

In the case where the optical characteristics of the lenses are being adjusted, once the optical characteristics of the lenses are determined for appropriately scaling the real world space, the optical characteristic settings are forwarded to the image encoder 128 for encoding. Along with the optical characteristic settings, the speed of change of the optical characteristic settings may also be provided to ensure that the scaling of the real world objects viewed through the whole display screen of the pair of AR glasses do not cause any disorienting effects to the user. Adjusting optical characteristic settings of the lenses is one way of dynamically scaling image of real world objects viewed through the lenses of the pair of AR glasses.

In an alternate implementation, the dynamic scaling of the real world objects is enabled by rendering the real world objects as virtual objects. In this implementation, image of the real world objects are captured, re-scaled and presented as virtual objects. Accordingly, when the real world objects viewed through the pair of AR glasses have to be dynamically scaled, the dynamic scaling engine 123 generates a signal to the real world object scaling engine 125 to perform a dynamic re-scaling of the real world objects. The real world object scaling engine 125 engages a scanning engine 131 to scan the real world scene in the vicinity of the user to identify the real world objects included therein and to capture the images of the real world objects. In response to the signal to re-scale the real world objects, the scanning engine 131 generates a signal to apply an occlusion mask to the lenses of the pair of AR glasses so as to block light of the incoming real world from reaching the eyes. The occlusion mask causes the lenses to transit from a transparent mode to a non-transparent mode. Simultaneously, scanning engine 131 activates the one or more image capturing devices/scanners 132 to capture the images of the real world objects. The one or more image capturing devices/scanners 132 are disposed on the surface of the pair of AR glasses and/or disposed in the real-world scene and connected to the pair of AR glasses either directly or through a console/computing device using wired or wireless connection.

In one implementation, the scanning engine 131 analyzes the captured images to identify the real world objects in the real world scene. Once the real world objects are identified, the scanning engine 131 selectively re-scales some of the real world objects so as to match to a scale of the virtual objects viewed through the pair of AR glasses and leaves other real world objects within the captured images intact at an original scale. In alternate implementation, the scanning engine 131 may re-scale all the real world objects in the captured images to match to a scale of the virtual objects that are being viewed through the pair of glasses.

The scanning engine 131 then forwards the re-scaled real world objects to a layout generation engine 134. As noted above, the layout generation engine 134 determines a layout of the real world objects in the real world space/scene and provides the layout information and the re-scaled real world objects to the machine learning algorithm 135. Based on the goal defined for the real world objects and the virtual objects, the machine learning algorithm may use the images and layout information of the real world objects and the virtual objects to identify the content that needs to be included in each frame of content. The content and layout details from the machine learning algorithm is provided to the content frame generation engine 127 to generate the frames of content.

The content frame generation engine 127 receives the input of the scaled virtual objects of the content from the virtual object scaling engine 124 or the un-scaled virtual objects of the content from the interactive application content receiving engine 122. Additionally, the content frame generation engine 127 also receives as input images of the scaled real world object, where available. These inputs are used to generate frames of content. The frames of content may include images of the dynamically scaled virtual objects or the original scaled virtual objects of content (i.e., un-scaled content) and/or images of dynamically scaled real world objects, where available. The frames of content are provided to the image encoder 128.

The image encoder 128 encodes the frames of content (scaled or un-scaled) and the data related to the optical characteristic settings of the lenses. The encoded content and optical characteristic settings (if available) are forwarded to the client device of the user for rendering, wherein the client devices could be the pair of AR glasses or the computing device that is communicatively connected to the pair of AR glasses.

The client device receives the encoded data and decodes the data using a decoder available at the client device. The decoded frames of content are provided to the pair of AR glasses for rendering as an overlay over the real world objects viewed through the pair of AR glasses. In addition to rendering the decoded frames of content, the optical characteristics of the lenses, where available, are also be applied to the lenses of the pair of AR glasses so that the real world objects viewed through the adjusted lenses are scaled to match to a scale of the virtual objects rendered as an overlay. As noted, the optical characteristics applied to the lenses take into consideration the visual characteristics of the user. In some implementations, one or more of the virtual objects included in the content of the video game may be filtered out prior to generating frames of content that is forwarded to the client device, where the content is decoded and rendered. The filtering may be done to minimize amount of the virtual objects that are rendered as overlay so that the content (real world objects from the real world space and virtual objects) viewed through the pair of AR glasses are not too cluttered to cause confusion or overwhelm the user.

In some implementations, in addition to scaling the virtual content (i.e., virtual objects of content generated by an interactive application), the sound generated from the virtual content or the sound received by the virtual content can also be scaled so as to normalize the sound generated in the real world and the virtual world. The scaling of the sound may be based on context of the interactive application (e.g., the video game) and in the context of the real world objects being viewed. In one implementation, feedback may be provided by the content scaling module to the user to place themselves in the real world space or in the context of the virtual content so that the user may be appropriately positioned relative to the virtual content being added as overlay over the real world space, as viewed through the pair of AR glasses. The feedback may be provided by the server executing the content scaling module 120, or by the interactive application (e.g., video game) or by machine learning algorithm 135.

In one implementation where a video game is being played between two players and the two players are sharing their respective real world spaces with each other, the real world spaces of the two players may be normalized. For example, if a first player's living room (i.e., an expansive space) is shared with a second player with whom the first player is playing the video game, and the second player's dorm room (i.e., constricted space) is shared with the first player, then the spaces and dimensions of the first and the second players are normalized so as to provide an even advantage to each player during gameplay of the video game played in the shared real world spaces. This type of normalization ensures that each player has an even playing field and avoids unfair advantage for one player with expansive space over another player with limited space—i.e., avoiding unfair advantages of the first player over the second player based on the differences in their real world settings or positioning within the different real world settings. Such normalization allows for the two players from two different environments to have normalized experience and have a match space that is equal. Similar advantage can be realized by adjusting optical characteristics of the two players so as to allow the two players to have a normalized view of the content of the video game and the real world space.

In an alternate implementation, the virtual objects included in the gameplay content may be scaled to match to a scale of the real world objects in the vicinity of a user prior to overlaying the gameplay content over the real world space as viewed through a pair of AR glasses. In the above example of a video game being played between two players who are remotely located, the virtual objects of the gameplay content may be dynamically scaled to match to a scale of a first set of real world objects included in first real world space in the vicinity of a first player prior to overlaying the gameplay content over the first set of real world objects viewed through a first pair of AR glasses of the first player. Similarly, the virtual objects included in the gameplay content may be dynamically scaled to match to a scale of a second set of real world objects included in second real world space in the vicinity of a second player prior to overlaying the gameplay content over the second set of real world objects viewed through a second pair of AR glasses of the second player. The dynamic scaling may be performed in response to input from the first player or the second player, or in response to signal from the content scaling module or the machine learning algorithm engaged by the content scaling module or by the server executing the content scaling module. In some implementations, a real world object from the vicinity of the first player and/or the second player may be selected for inclusion as a virtual object that can be rendered alongside the virtual objects of the gameplay content of the video game, in the video game application providing the gameplay content. The real world object for inclusion may be selected by the first player, or the second player, or by both the first and the second players. In one implementation where the real world object is selected only by the first player or the second player, the image of the virtual object representing the selected real world object may be included in the view of only that player that selected the real world object (i.e., included in the view of only the first player or the second player who made the selection). In alternate implementation, the real world object selected for inclusion as a virtual object by either the first player or the second player may be shared with the other player. In this case, the virtual object representing the real world object selected for inclusion by the first or the second player is presented alongside the virtual objects of the content of the video game in the overlay viewed through both the first and the second pair of AR glasses of the first and the second players, respectively. The image of the real world object is dynamically scaled to match to a scale of the virtual objects of the gameplay content that is being rendered in the overlay over the real world objects viewed through the pair of AR glasses of the first and/or of the second player or the pairs of AR glasses. In some implementations, a first real world object was selected by a first player from a first real world space in the vicinity of the first player for inclusion as a first virtual object. Simultaneously, a second real world object was selected by a second player from a second real world space in the vicinity of the second player for inclusion as a second virtual object, wherein the first real world object and the second real world object were selected for sharing with one another. In such implementations, both the first and second real world objects are projected as first and second virtual objects, respectively, and projection is rendered to scale so as to match to a scale of the virtual objects of the gameplay content included in the overlay. The dynamic scaling includes scaling the dimensions of the first and the second virtual objects prior to inclusion in the overlay.

In one implementation, the content scaling module 120 may be used to add one or more real world objects from the real world space of the user as virtual objects viewed through the pair of AR glasses. The virtual objects that are added from the real world space are in addition to the virtual objects of the content that are overlaid over the real world objects as viewed by the user through the pair of AR glasses. For example, a dog, a cat, or a child in the real world space of the user may be added as a virtual character alongside the virtual objects of the content of the video game. Alternately, from the above example of two players sharing the real world space, one or more real world objects in a first real world space of the first player and one or more real world objects in a second real world space of the second player may be included with the virtual objects of the content rendered over the real world objects of the first and the second players. This type of normalization of adding content from one another's real world space assists in bring in an accurate blend between the virtual world and the real world spaces of the two players. Other advantages may be envisioned by one skilled in the art from the various figures and the description provided herein.

Figure 2A:
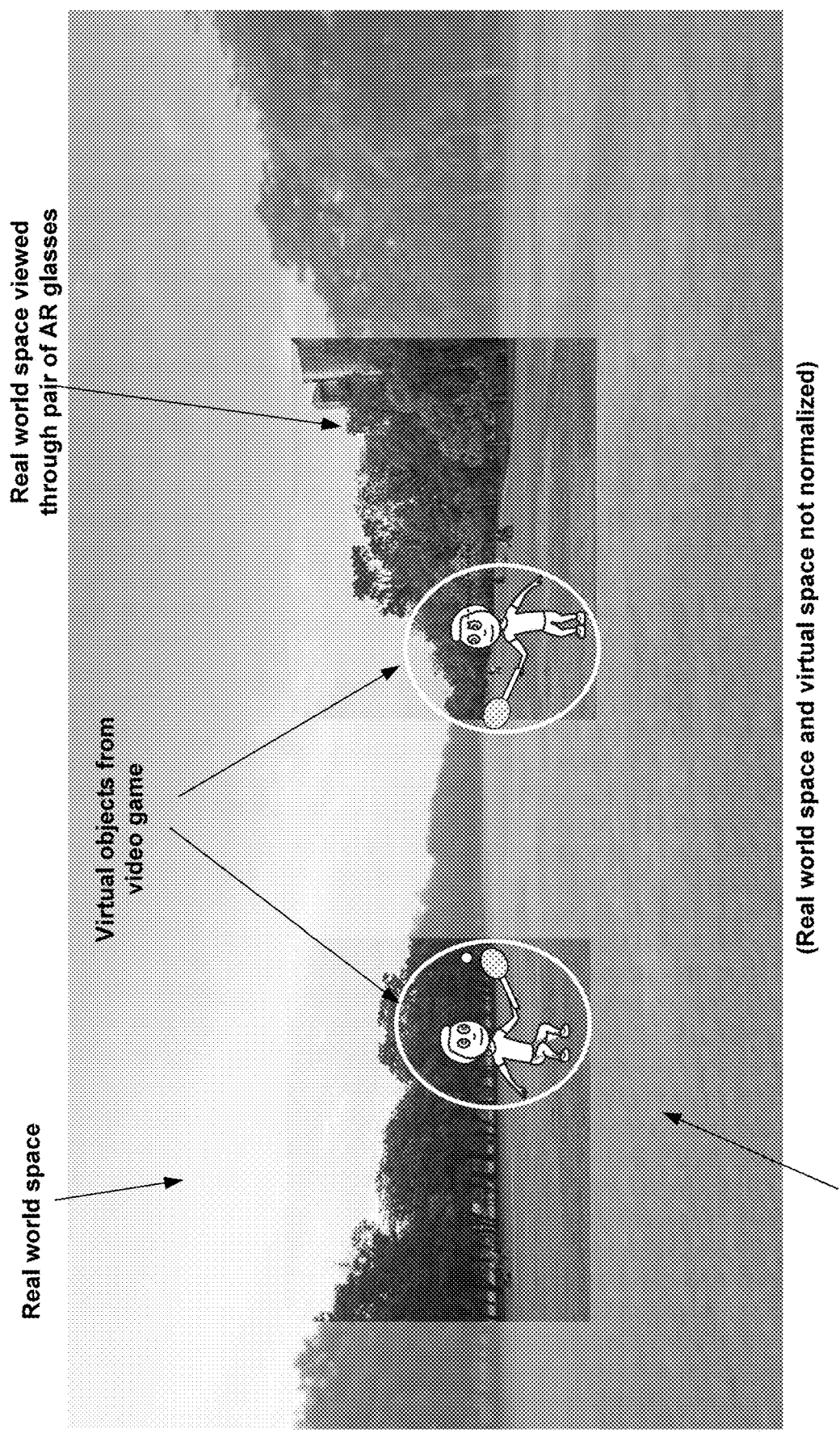
FIG. 2A illustrates a display screen of a pair of augmented reality glasses worn by a user rendering an augmented reality image wherein size of the real world objects are rendered disproportionate to virtual objects from content of an interactive application, in accordance with one implementation.

FIG. 2A illustrates a rendition of a real world space as viewed through a pair of AR glasses over which virtual objects from the content of the virtual game are overlaid, wherein neither the view of the real world objects of the real world space nor the virtual objects of the content are scaled for normalization, in one implementation. The real world space shows a plurality of real world characters in the background (e.g., underneath the tree) while virtual characters from the content of the video game is rendered as an overlay in the foreground. However, the scale of the virtual characters does not match the scale of the real world characters in the background.

Figure 2B:
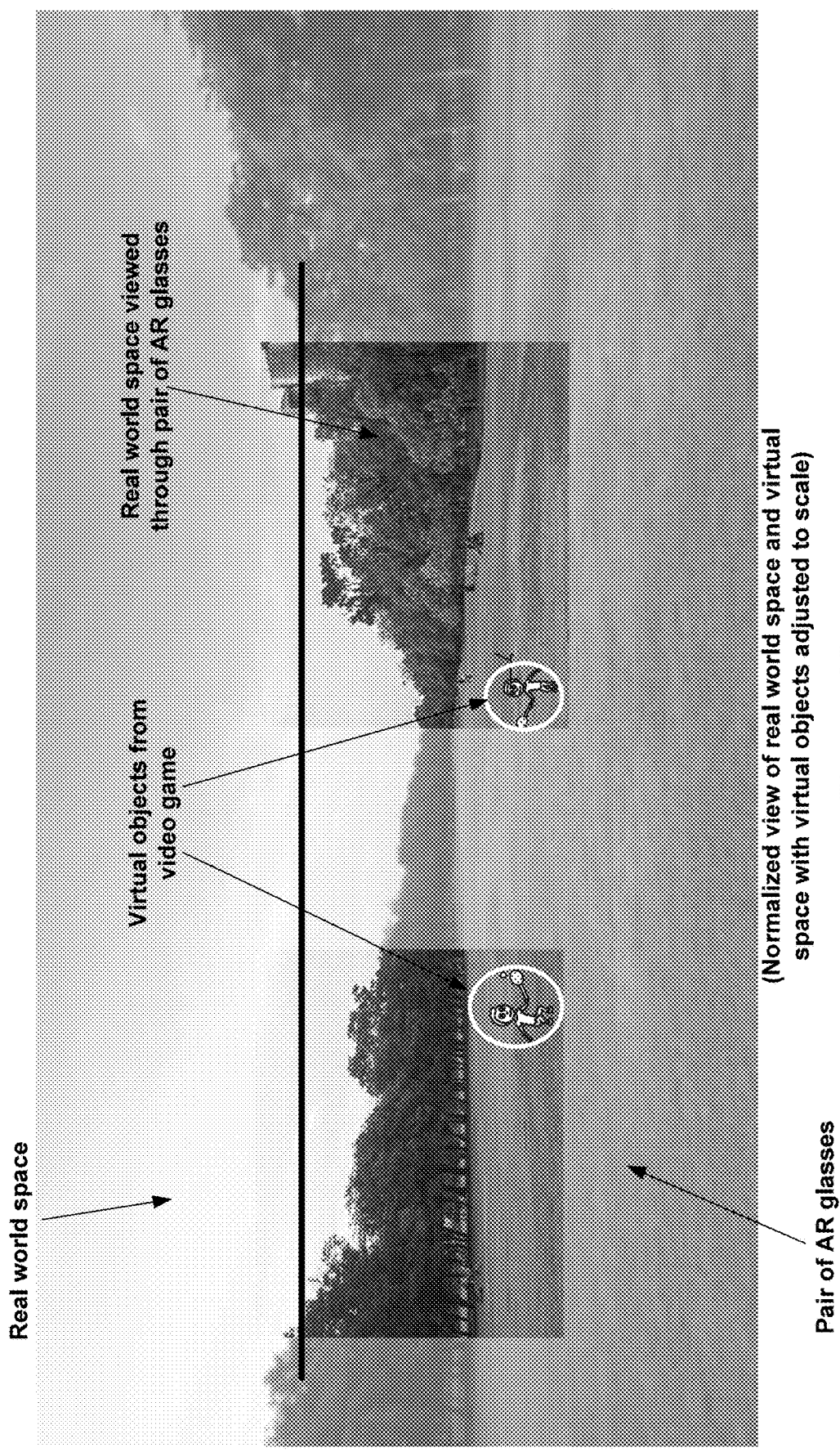
FIG. 2B illustrates a display screen of a pair of augmented reality glasses worn by a user rendering an augmented reality image wherein size of the real world objects are scaled to match a scale of virtual objects from content of the interactive application, in accordance with one implementation of the disclosure.

FIG. 2B illustrates a rendition of the real world space of FIG. 2A with the virtual characters being scaled so as to normalize the views of the real world space with the virtual objects, in one implementation. In this implementation, the virtual characters are projected over the real world space as overlay at a scale that matches a scale of the real world characters.

Figure 3B:
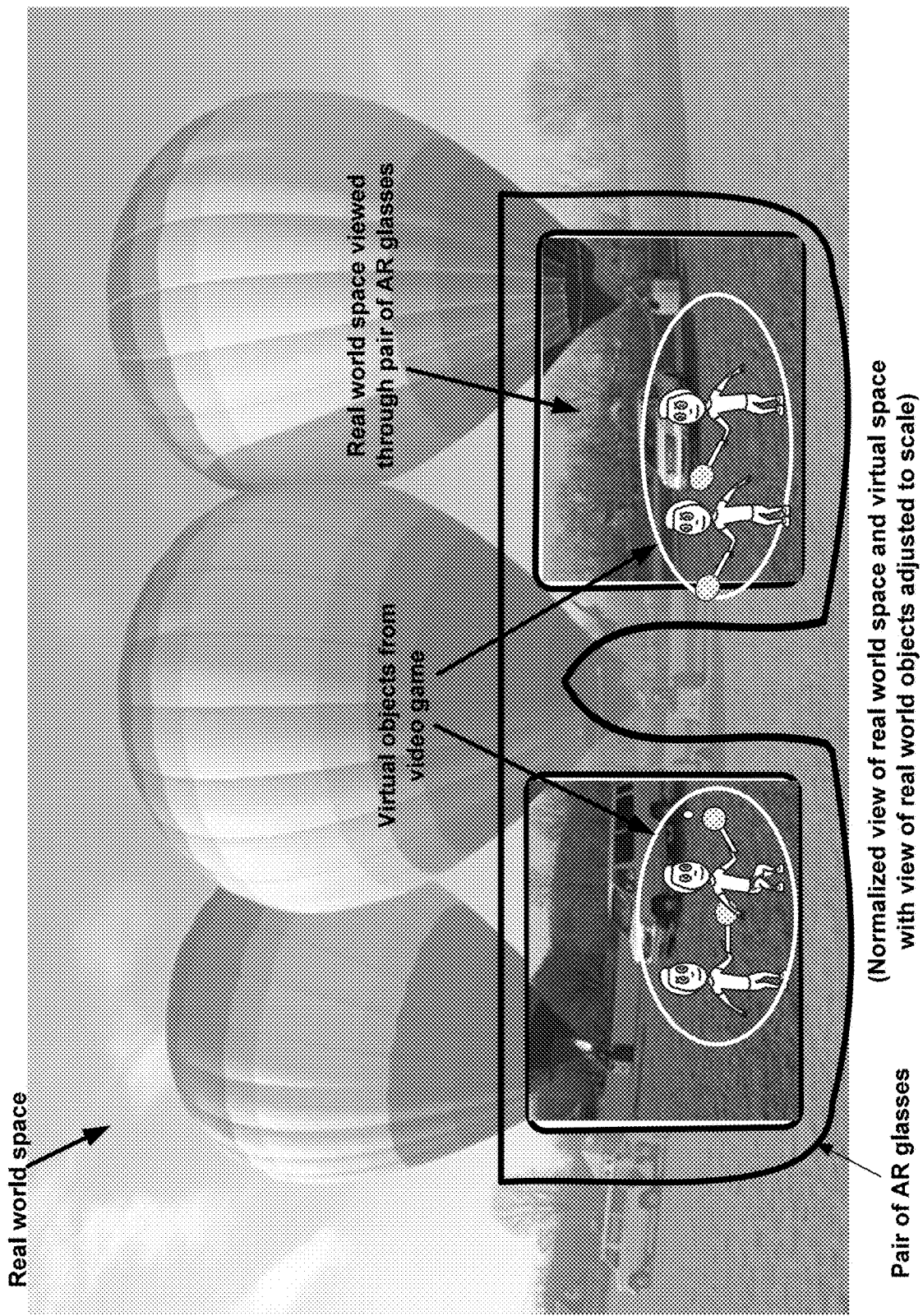
FIG. 3B illustrates a display screen of a pair of augmented reality glasses worn by a user rendering an augmented reality image wherein size of the virtual objects from content of the interactive application are dynamically scaled to match a scale of real world objects, in accordance with one implementation of the disclosure.

FIG. 3A illustrates a rendition of the real world space as viewed through a pair of AR glasses of the user and the virtual objects of the content of video game are projected over the real world space as an overlay, wherein neither the view of the real world objects nor the virtual objects of the content are normalized, in one implementation. FIG. 3B illustrates a rendition of the view of the real world space that has been scaled to match to a scale of the virtual objects of the content, in one implementation. The view of the real world space may be adjusted by adjusting the optical characteristics of the lenses so as provide normalized view of the real world objects to the virtual objects of the content, in one implementation. In this implementation, the virtual objects of the content are projected unaltered. However, the dynamic scaling of the view of the real world space ensures that the user is presented with a normalized view of the real world space and the content of the video game projected over the real world space.

Figure 4A:
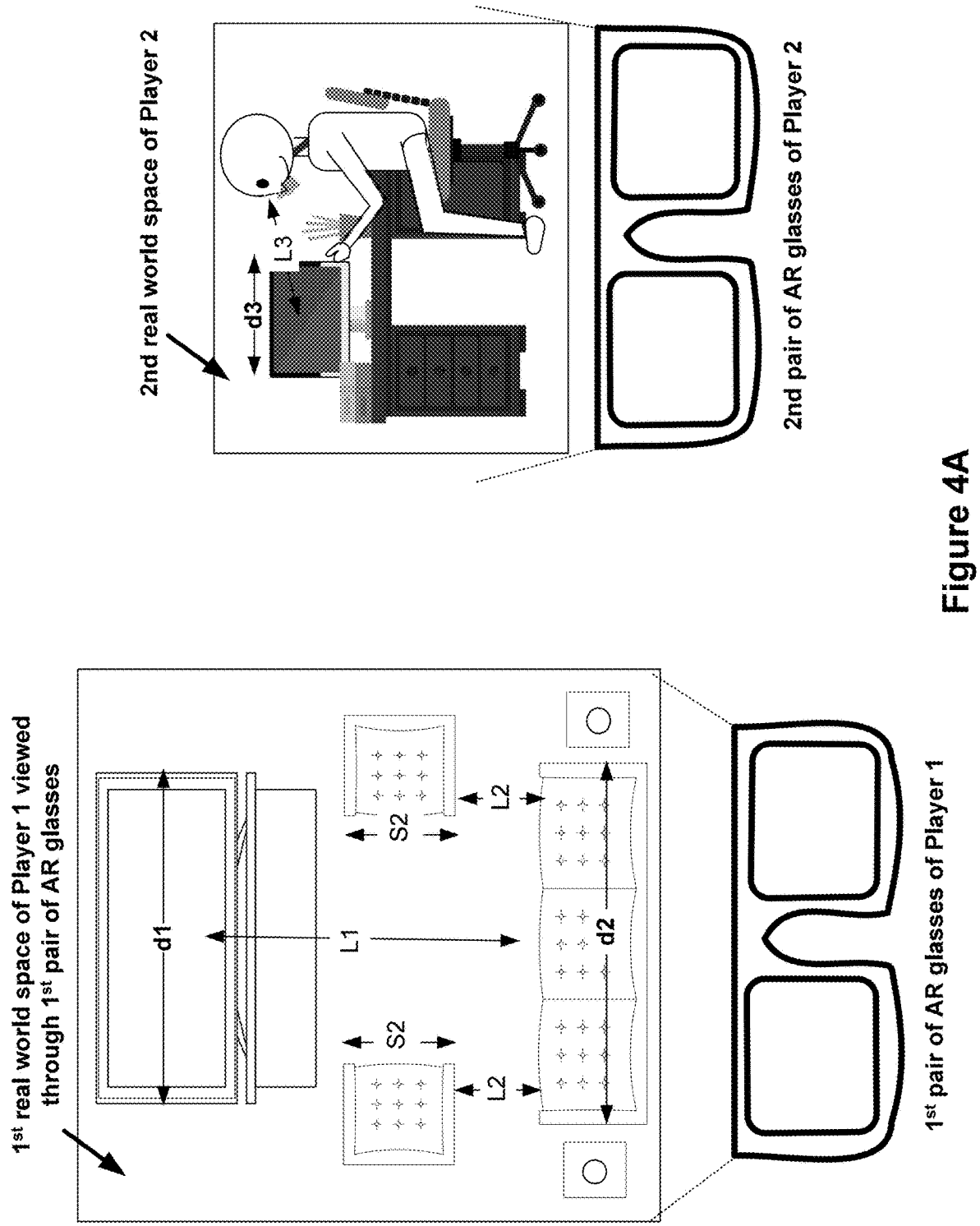
FIG. 4A illustrates images of a first real world space in vicinity of a first player as viewed through a first pair of AR glasses worn by a first player and images of a second real world space in vicinity of a second player as viewed through a second pair of AR glasses worn by a second player, wherein a scale of real world objects in the first real world space does not match the scale of the real world objects in the second real world space, in accordance with one implementation of the disclosure.

FIG. 4A illustrates a view of a first real world space in the vicinity of a first player as viewed through a first pair of AR glasses of the first player, and a view of a second real world space in the vicinity of a second player as viewed through a second pair of AR glasses of the second player, in one implementation. The first player is engaged in playing a video game with the second player. In the implementation illustrated in FIG. 4A, the first real world space and the second real world space are not normalized to one another. As shown, the first player may be playing from an expansive living room space while the second player may be playing from a constricted dorm room space thereby allowing the first player with a spatial advantage over the second player. For instance, the first real world space includes a display screen on which the content of the video game is rendered and is of width 'd1', the first player is separated from the display screen by a space of length 'L1', the big sofa is separated from the smaller sofas by a length 'L2', the big sofa has a width 'd2', a smaller sofas are of the size 'S2', to name a few. These dimensions may be determined by analyzing images taken of the first real world space by scanners, image capturing devices, sensors, etc., available on the first pair of AR glasses, on a computing device communicatively connected to the first pair of AR glasses, or dispersed in the first real world space. Similarly, the second real world space includes a display screen that is separated from the second player by a distance 'L3', and the size of the display screen of the second player is represented by 'd3'. As can be seen, the space available to the first player in the first real world space is larger than the space available to the second player in the second real world space thereby providing an unfair advantage to the first player over the second player.

Figure 4B:
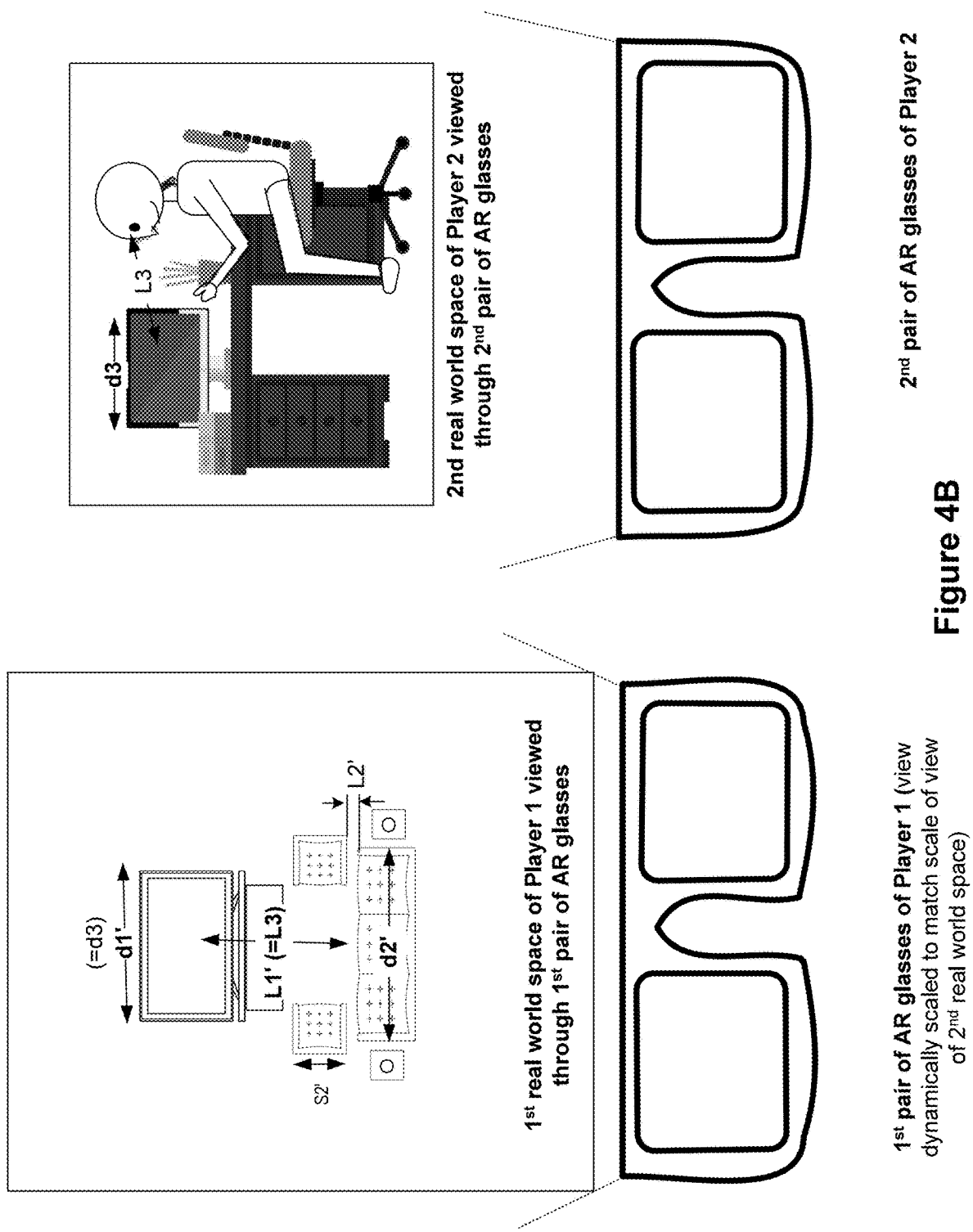
FIG. 4B illustrates images of a first real world space in vicinity of a first player as viewed through a first pair of AR glasses and a second real world space in vicinity of a second player as viewed through a second pair of AR glasses, wherein the views are normalized by adjusting a scale of first set of real world objects in the first real world space to match a scale of a second set of real world objects in the second real world space, in accordance with one implementation of the disclosure.

FIG. 4B illustrates the views of the first real world space and the second real world space as viewed through the first and the second pair of AR glasses, respectively, being normalized. The normalization of the views is accomplished by dynamically scaling the spaces and dimensions of the first real world space and first set of real world objects dispersed in the first real world space as viewed through the first pair of AR glasses of the first player so as to match the scaling of the view of the second real world space and the second set of real world objects of the second real world space of the second player as viewed through the second pair of AR glasses. For instance, as part of normalization, the space between the first player and the display screen in the first real world space as viewed through the first pair of AR glasses may have been adjusted to L1', which may be approximately equal to the separation distance L3 between the second player and the display screen in the second real world space. Similarly, the length between the smaller sofas and the large sofa represented as L2' as viewed through the first pair of AR glasses may have been dynamically adjusted so that L2' such that L2'<L2. The size of the smaller sofas as viewed through the first pair of AR glasses of the first player, may have been dynamically adjusted so that the image of the smaller sofas is S2', wherein S2'<S2. Further, the size of the display screen in the first real world space as viewed through the first pair of AR glasses, may have been dynamically adjusted to d1', which may be approximately equal to d3, the size of the display screen used by the second player in the second real world space. This dynamic scaling by adjusting dimensions of real world objects and spaces between real world objects as viewed through the respective first and second pair of AR glasses normalizes the views of the first and the second real world space allowing each player to have a level playing field thereby avoiding unfair advantage of one player over the other.

It should be noted that the term "engine" or "module" as used to represent the various sub-modules of the content scaling module 120, in one implementation, refers to a program or piece of code that is configured to perform a certain function. The program or code may use deep learning algorithm to query certain ones of the data and/or process the data (e.g., inputs from the users, images of the real world spaces, images of media content, etc.). In the case of dynamic scaling engine 123, the program may be used to analyze the various data (virtual environment or real world space) to determine the various attributes of the real world objects and the virtual objects and use the various attributes to determine a scale at which the different objects (virtual or real world objects) are being rendered or viewed, and to dynamically scale the virtual objects or adjust the optical characteristics of lenses of the pair of AR glasses to normalize the views of the real world and the virtual environment. The content scaling module 120 may be implemented as a software, a hardware, or firmware.

Figure 5A:
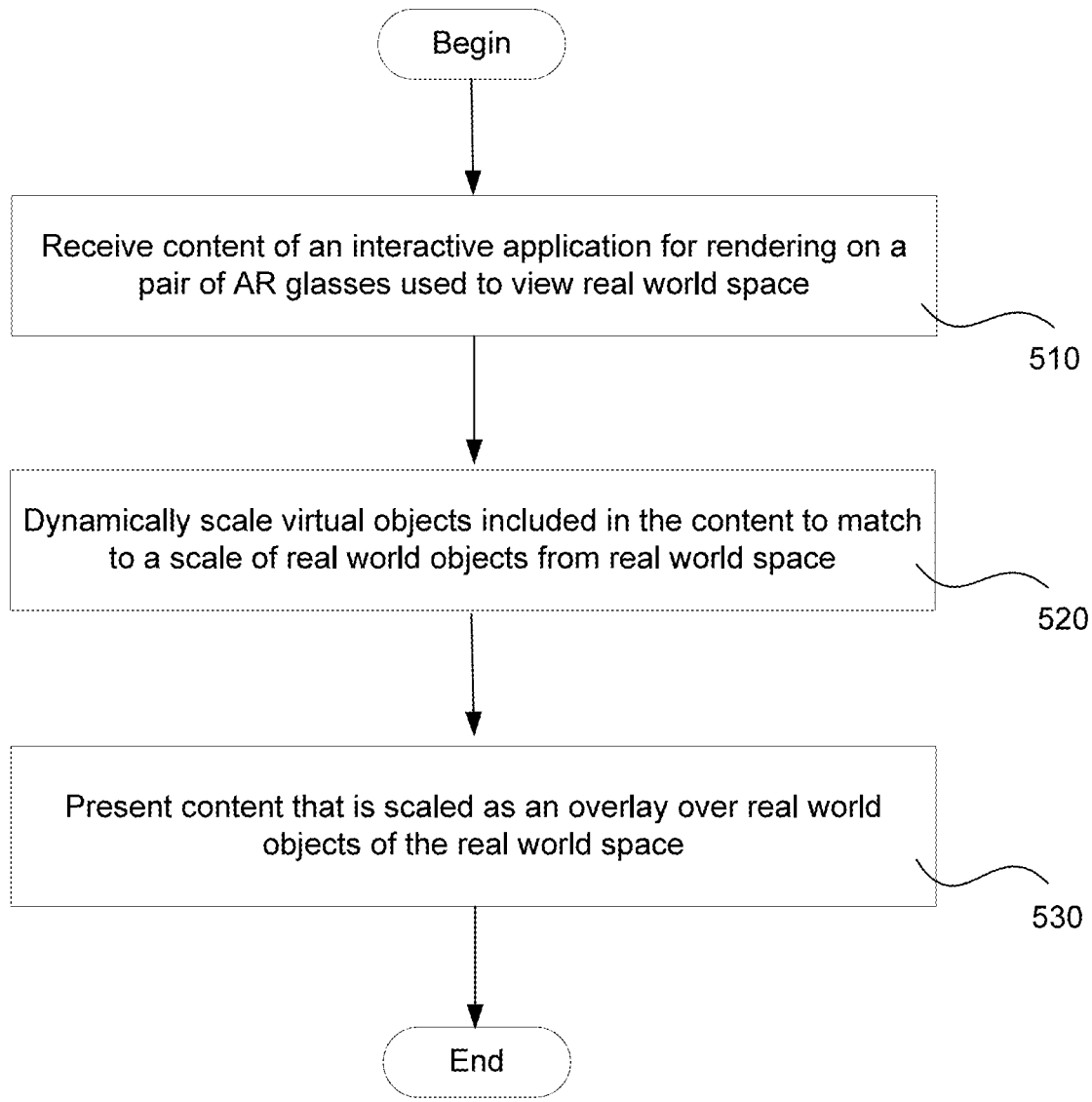
FIG. 5A illustrates flow operations of a method for normalizing views of real world objects in real world space viewed through a pair of AR glasses with virtual objects included in content of an interactive application, in accordance with one implementation of the present disclosure.

FIG. 5A illustrates flow of operations of a method used for normalizing views of real world space and virtual environment as viewed through a pair of AR glasses, in one implementation. The method begins at operation 510 wherein content of an interactive application is received for rendering on a display screen of a pair of AR glasses worn by a user to view real world space in the vicinity of the user. The interactive application may be a video game and the content can be the gameplay content that is generated in response to inputs provided by the user during gameplay. The content may be streaming content that changes based on changes to the game state of the game, wherein the game state is determined from the inputs of the user.

In response to receiving the AR content (i.e., virtual content from the gameplay), a scale of the real world objects as viewed through the pair of AR glasses is determined and the scale of the virtual objects is dynamically adjusted to match the scale of the real world objects, as illustrated in operation 520. The scale of the real world objects may be determined by capturing images of the real world objects in the real world space using scanners, image capturing devices, such as cameras, and sensors available at the pair of AR glasses, at a computing device that is local to and communicatively connected to the pair of AR glasses, or dispersed in the real world space. The captured images may be analyzed to identify the layout of the real world space, the various real world objects dispersed in the real world space, and determine various attributes of the real world objects including type and number of real world objects of each type, estimation of the size, depth, location, orientation of the real world objects to one another and in relation to the user, etc. The various attributes of the real world objects may be used to determine the scale of the real world objects as viewed through the pair of AR glasses. Based on the scale of the real world objects determined from the analysis, the virtual objects may be dynamically scaled so that the scale of the virtual objects match the scale of the real world objects.

The scaled virtual objects are then provided as an overlay for rendering over the real world objects being viewed through the pair of AR glasses, as illustrated in operation 530. The dynamic scaling of the virtual objects enables providing normalized views of the real world objects and the virtual objects, when viewed through the pair of AR glasses.

Figure 5B:
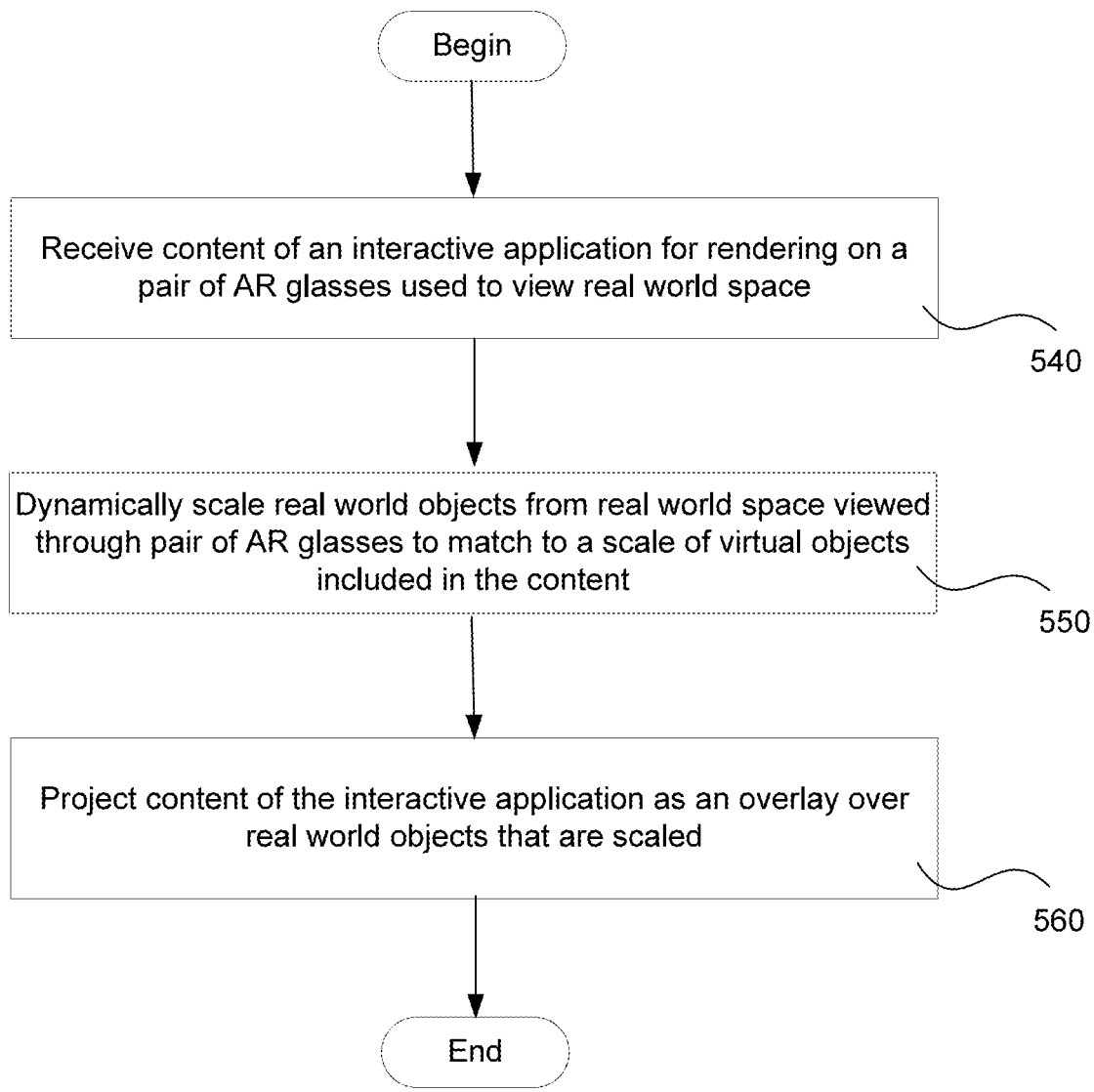
FIG. 5B illustrates flow operations of a method for normalizing views of real world objects in real world space viewed through a pair of AR glasses with virtual objects included in content of an interactive application, in accordance with an alternate implementation of the present disclosure.

FIG. 5B illustrates flow of operations of a method used for normalizing views of real world space in vicinity of user and virtual environment as viewed through a pair of AR glasses, in another implementation. The method begins at operation 540, wherein content of an interactive application is received for rendering on the pair of AR glasses. The interactive application, as stated with reference to FIG. 5A, may be video game application that generates streaming gameplay content in response to inputs from the user. The gameplay content represents the virtual environment and includes virtual objects, including virtual characters and virtual scene. The pair of AR glasses are used to view the real world space in the vicinity of the user, while interacting with the gameplay content of the video game.

Responsive to receiving the gameplay content of the video game, a content scaling module may determine a scale of the gameplay content that is being provided for rendering and a scale of the real world objects. Based on the determination, when the scale of the real world objects does not match the scale of the virtual objects, the content scaling module may dynamically scale the real world objects as viewed through the pair of AR glasses, as illustrated in operation 550. The dynamic scaling is to match the scale of the real world objects to the scale of the virtual objects included in the gameplay content of the video game. The dynamic scaling of the real world objects, in one implementation, is by adjusting optical characteristics of the lenses of the pair of AR glasses such that the scale of the real world objects viewed through the pair of glasses matches the scale of the gameplay content. As noted with reference to FIG. 1C, depending on the type of lenses used, different ways of adjusting the optical characteristics of the lenses can be envisioned.

The virtual objects of the gameplay content are then projected over the scaled real world objects of the real world space as an overlay, as illustrated in operation 560. The scaling of the real world objects ensures normalization of the views of the real world objects and the virtual objects of the gameplay content. This type of normalization allows a user to have an even playing field when they user plays the video game with another user.

Figure 5C:
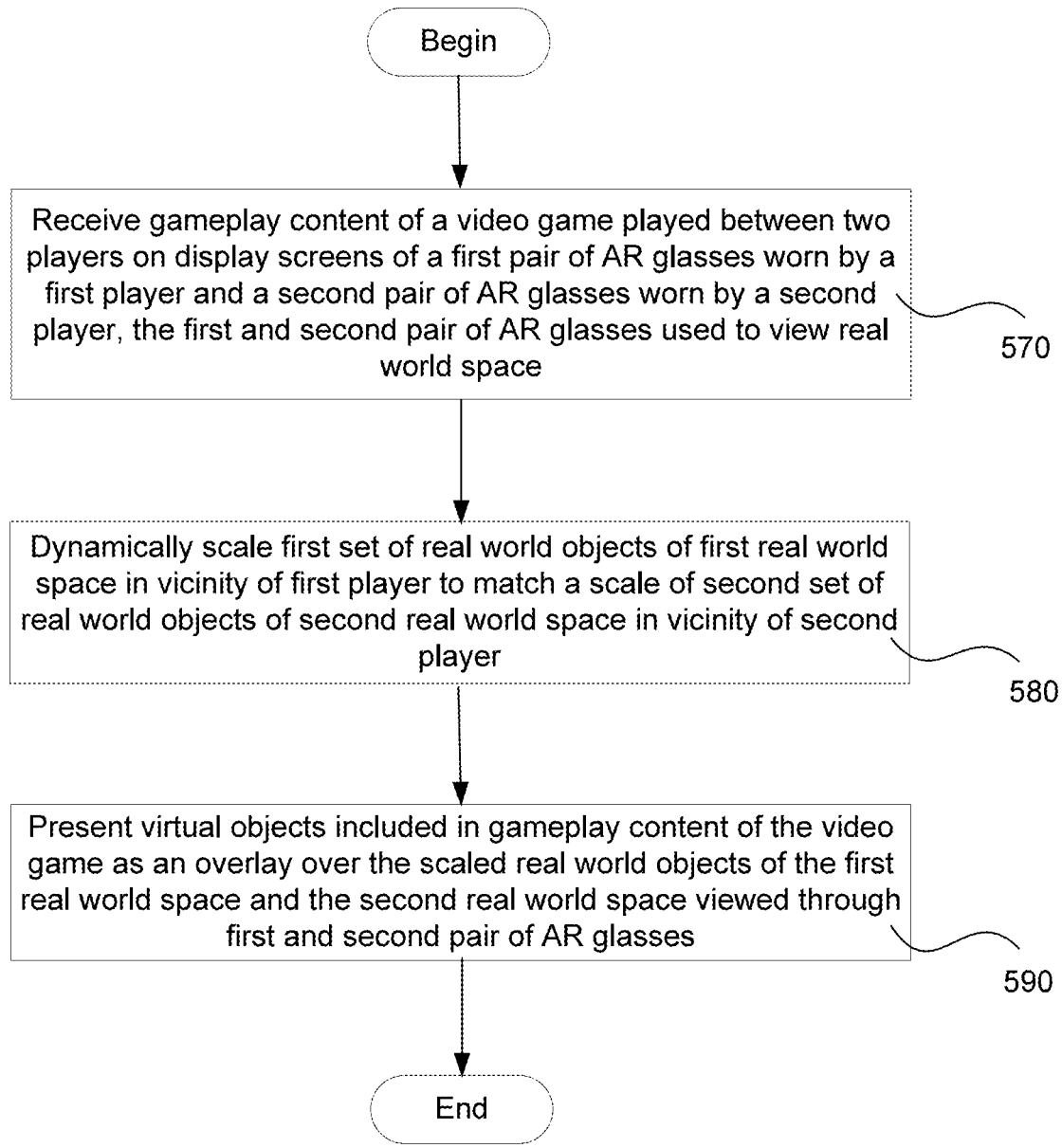
FIG. 5C illustrates flow operations of a method for normalizing view of a first set of real world objects in first real world space with a view of second set of real world objects in second real world space as viewed through first and second pairs of AR glasses of first and second players and rendering of virtual objects from content of an interactive application as overlays, in accordance with one example implementation of the present disclosure.

FIG. 5C illustrates flow of operations of a method for normalizing views of the real world spaces shared between two players and with virtual objects from an interactive application, in yet another implementation of the invention. The method begins at operation 570, wherein gameplay content of a video game played between a first player and a second player, is received. The first player plays and interacts with the video game and receives the gameplay content for rendering on a display screen associated with a first pair of AR glasses. Similarly, the second player plays and interacts with the video game and receives the gameplay content for rendering on a display screen associated with a second pair of AR glasses. The first pair and the second pair of AR glasses are used by the first and the second player, respectively, to view the real world objects in the vicinity of the first and the second players.

In operation 580, a first set of real world objects in first real world space in vicinity of the first player is dynamically scaled to match a scale of a second set of real world objects in the second real world space in the vicinity of the second player as viewed through the first and the second pair of AR glasses. The dynamic scaling of the real world objects in the first and the second real world spaces may be done by adjusting optical characteristics of the lenses of the first and/or the second pair of AR glasses. The dynamic scaling allows normalized views of the first real world space as viewed through the first pair of AR glasses of the first player and the second real world space as viewed through the second pair of AR glasses of the second player.

In operation 590, the virtual objects included in the gameplay content of the video game played between the first player and the second player are projected as overlays over the first real world space as viewed by the first player through the first pair of AR glasses and the second real world space as viewed by the second player through the second pair of AR glasses. The dynamic scaling of the real world spaces as viewed by the first and the second players allows for normalized views of the real world spaces shared between the two players and the gameplay content rendered over the respective real world spaces further normalizes the views between the real world space and the virtual environment of the video game. This way of providing normalized views of the real world spaces and the virtual environment allows the users to enjoy video game on equal footing and avoids unfair advantage one user may have over another user based on their respective real world settings or their respective positioning in their real world settings.

Other advantages will become apparent to one skilled in the art upon reading the various implementations provided herein.

Figure 6:
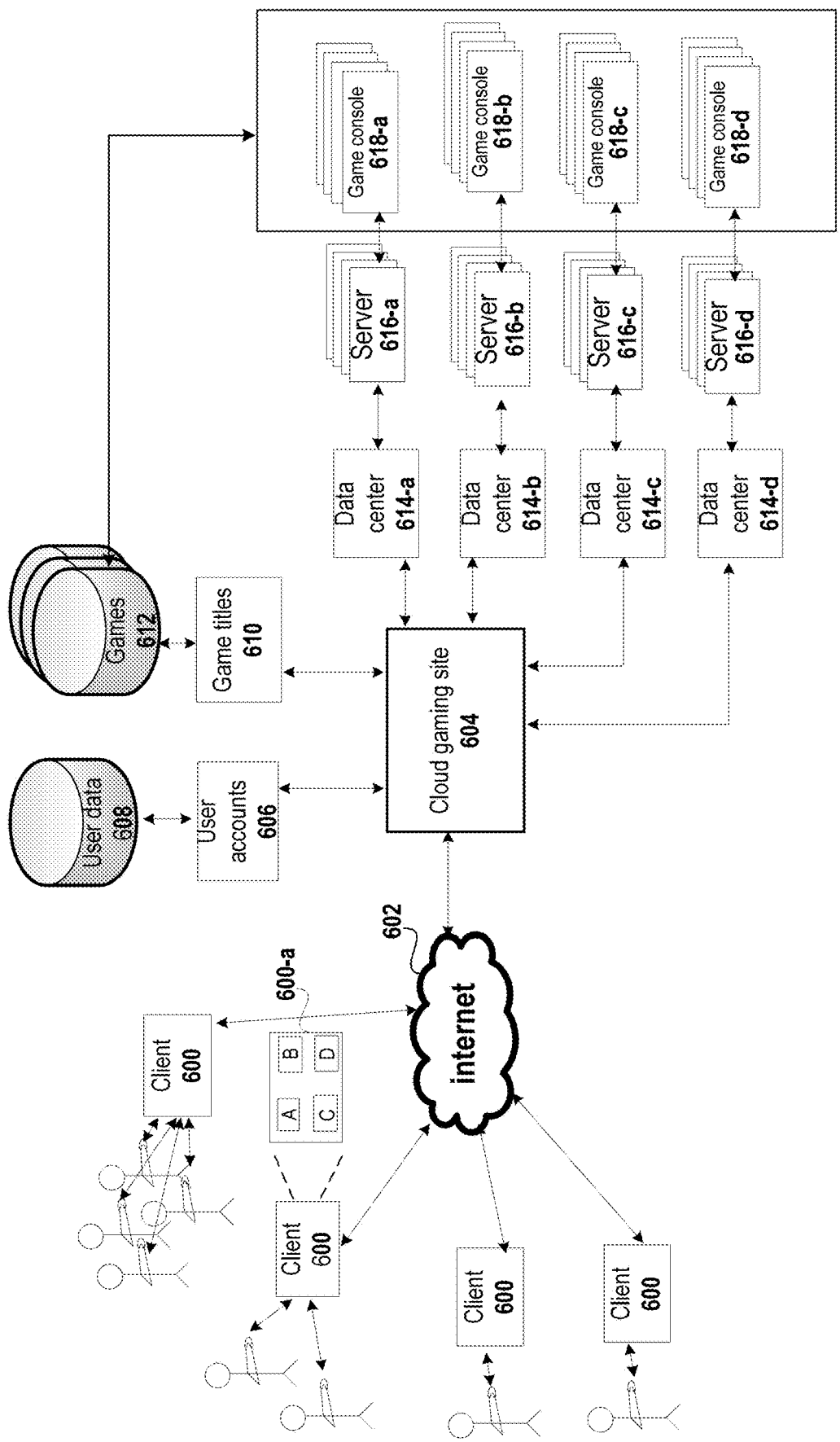
FIG. 6 illustrates an exemplary system used to load interactive application (e.g., video games) available at a cloud gaming site, in accordance with implementations of the disclosure.

FIG. 6 illustrates an exemplary system used to load game files for a game available through a cloud gaming site. The system includes a plurality of client devices 600 (100 of FIG. 1A) that are communicatively connected to the cloud gaming site 604 (104 of FIG. 1A) over a network 602 (102 of FIG. 1A), which can include a LAN, wired, wireless, cellular (e.g. 4G, 5G, etc.), or any other type of data network, including the Internet. When a request to access the cloud gaming site 604 is received from a client device 600, the cloud gaming site 604 accesses user account information 606 (106 of FIG. 1A) stored in a user data database 608 (108 of FIG. 1A) to identify a user associated with a client device through which the request is initiated. In some embodiments, the cloud gaming site may also validate the identified user in order to determine all the games the user is authorized to view/play. Following user account identification/validation, the cloud gaming site accesses a game titles datastore 610 (110 of FIG. 1A) to identify the game titles that are available at the game cloud site for the user account initiating the request. The game titles datastore 610, in turn, interacts with a games database 612 (112 of FIG. 1A) to obtain the game titles for all the games that are available for the cloud gaming site. As new games are introduced, the games database 612 will be updated with the game code and the game titles datastore 610 will be provided with game titles information for the newly introduced games. The client device from where the request is initiated may or may not be registered with the cloud gaming site, when the request was initiated. If the user of the client device initiating the request is not a registered user, then the cloud gaming site may identify the user as a new user and select the game titles (for e.g., a default set of game titles) that are appropriate for a new user. The identified game titles are returned to the client device for presenting on a display screen 600-a, as shown in FIG. 6.

User interaction at one of the game titles rendered on the client device is detected and a signal is sent to the cloud gaming site. The signal includes the game title information where the user interaction was detected and the user interaction registered at the game title. In response to the signal received from the client device, the cloud gaming site proactively determines a data center from among a plurality of data centers (614-a-614-d) where the game is being hosted and sends a signal to the identified data center 614 to load the game associated with the game title for which the user interaction is detected. In some embodiments, more than one data center may be hosting the game. In such embodiments, the cloud gaming site may determine the geo location of the client device initiating the request and identify a data center that is geographically close to the client device and signal the data center to pre-load the game. The geo location of the user may be determined using a Global Position System (GPS) mechanism within the client device, the client's IP address, the client's ping information, to name a few. Of course, the aforementioned ways to detect the geo location of the user may be exemplary and other types of mechanisms or tools may be used to determine the geo location of the user. Identification of a data center that is close to the client device can minimize latency during user interaction with the game. In some embodiments, the identified data center may not have the required bandwidth/capacity/resources to host the game or may be overused. In these embodiments, the cloud gaming site may identify a second data center that is geographically close to the client device. The loading of the game includes loading game code and executing an instance of the game.

In response to receiving the signal from the cloud gaming site, the identified data center may select a server 616 from among a plurality of servers at the data center 614 to instantiate the game on the server. The server is selected based on the hardware/software capabilities available and the game requirements. The server may include a plurality of game consoles 618 and the server may determine which one of the plurality of game consoles to use to load the game. The game console may be similar to an independent game console, or may be a rack-mounted server or a blade server. The blade server, in turn, may include a plurality of server blades with each blade having required circuitry for instantiating a single dedicated interactive application, such as the video game. Of course, the game console described above is exemplary and should not be considered restrictive. Other types of game consoles, including game stations, etc., and other forms of blade server may also be engaged for hosting the identified game.

Once the game console is identified, the generic game-related code for the game is loaded onto the game console and a signal is returned to the client device via the cloud gaming site over the network identifying the game console on which the game is instantiated. The loaded game is thus made available to the user.

Figure 7:
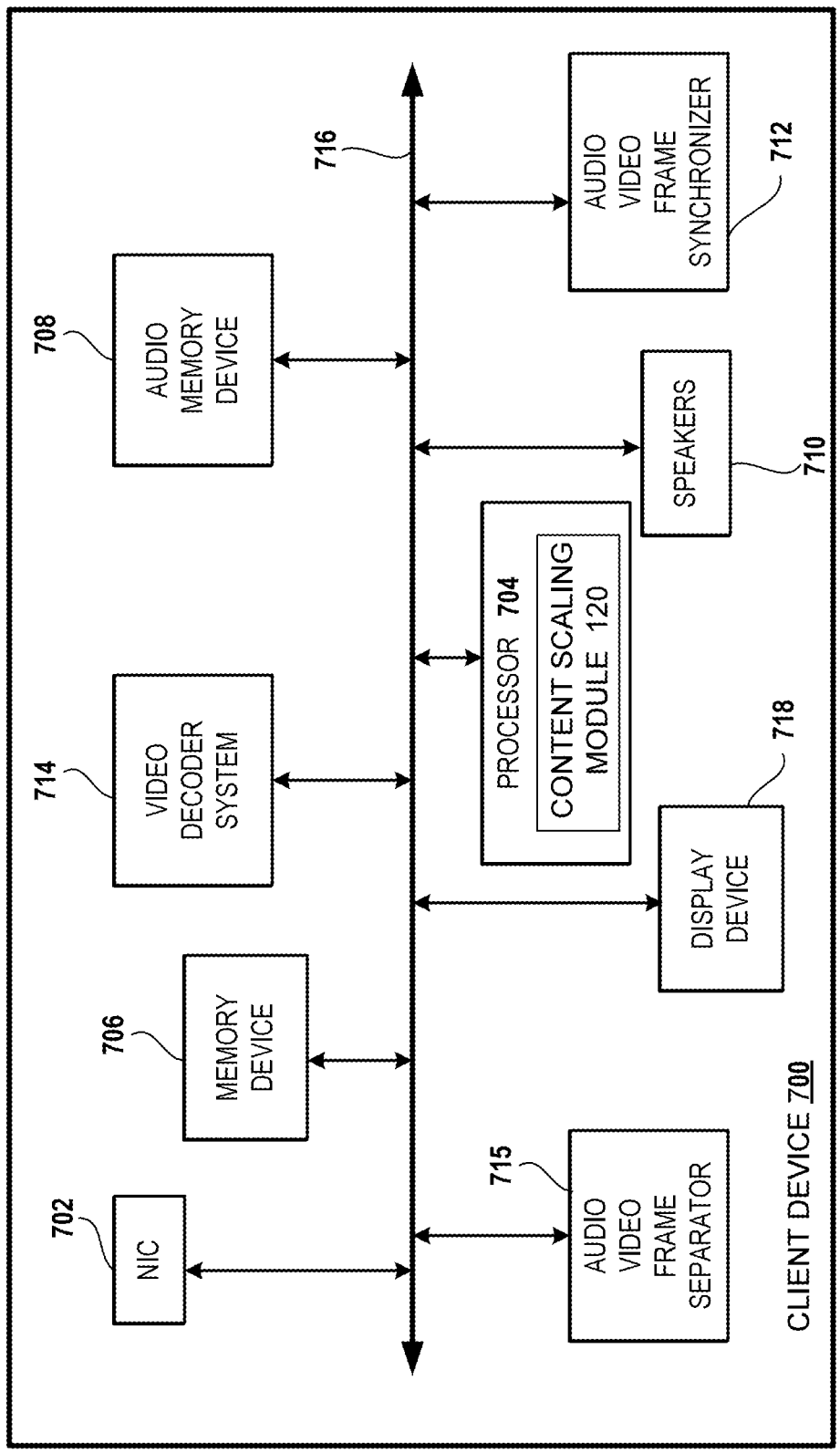
FIG. 7 is a diagram of an embodiment of a client device.

FIG. 7 is a diagram of an embodiment of a client device 700 (100 of FIG. 1A). The client device 700 includes multiple components, such as the Network Interface Card (NIC) 702, a processor 704, a memory device 706, an audio memory device 708, one or more speakers 710, an audio video frame synchronizer 712, a video decoder system 714, an audio video frame separator 715, and the display device 718. The components of the client device 700 are coupled to each other via a bus 716.

An example of the audio video frame separator 715 is a processor or a FPGA or a PLD or a controller or a microprocessor or a microcontroller or a CPU. An example of the audio video frame synchronizer 712 is a processor or a FPGA or a PLD or a controller or a microprocessor or a microcontroller or a CPU.

The NIC 702 applies the communication protocol to a stream that includes multiple encoded image frames, and multiple audio frames. The communication protocol is applied to parse the stream obtain the encoded image frames and the audio frames, and sends the encoded image frames and the audio frames via the bus 716 to the audio video frame separator 715.

The audio video frame separator 715 separates the encoded image frames from the audio frames. For example, the audio video frame separator 715 identifies a difference between file extension of the encoded image frames and a file extension of the audio frames to distinguish the encoded image frames from the audio frames.

The audio video frame separator 715 sends the audio frames via the bus 716 to the audio memory device 708 and sends the encoded image frames via the bus 716 to the video decoder system 714. The audio frames are stored in the audio memory device 708.

The video decoder system 714 applies the decoding protocol to output decoded image frames based on the encoded image frames and sends the decoded image frames to the audio video frame synchronizer 712. The audio video frame synchronizer 712 accesses the audio frames from the audio memory device 708 and synchronizes the audio frames with the decoded image frames. For example, the audio video frame synchronizer 712 matches a timing at which each of the decoded image frames is displayed on the display device 718 with a timing at which sound based on a corresponding one of the audio frames is to be output by the one or more speakers 710.

The audio video frame synchronizer 712 sends the decoded image frames via the bus 716 to the display device 718, which displays the decoded images on a display screen of the display device 718. Also, simultaneous with the display of the decoded images, the one or more speakers 710 output the sound based on the image frames in a synchronized manner.

The processor 704 controls one or more of the components of the client device 700. For example, the processor 704 executes an operating system that enables communication between the components via the bus 716.

Figure 8:
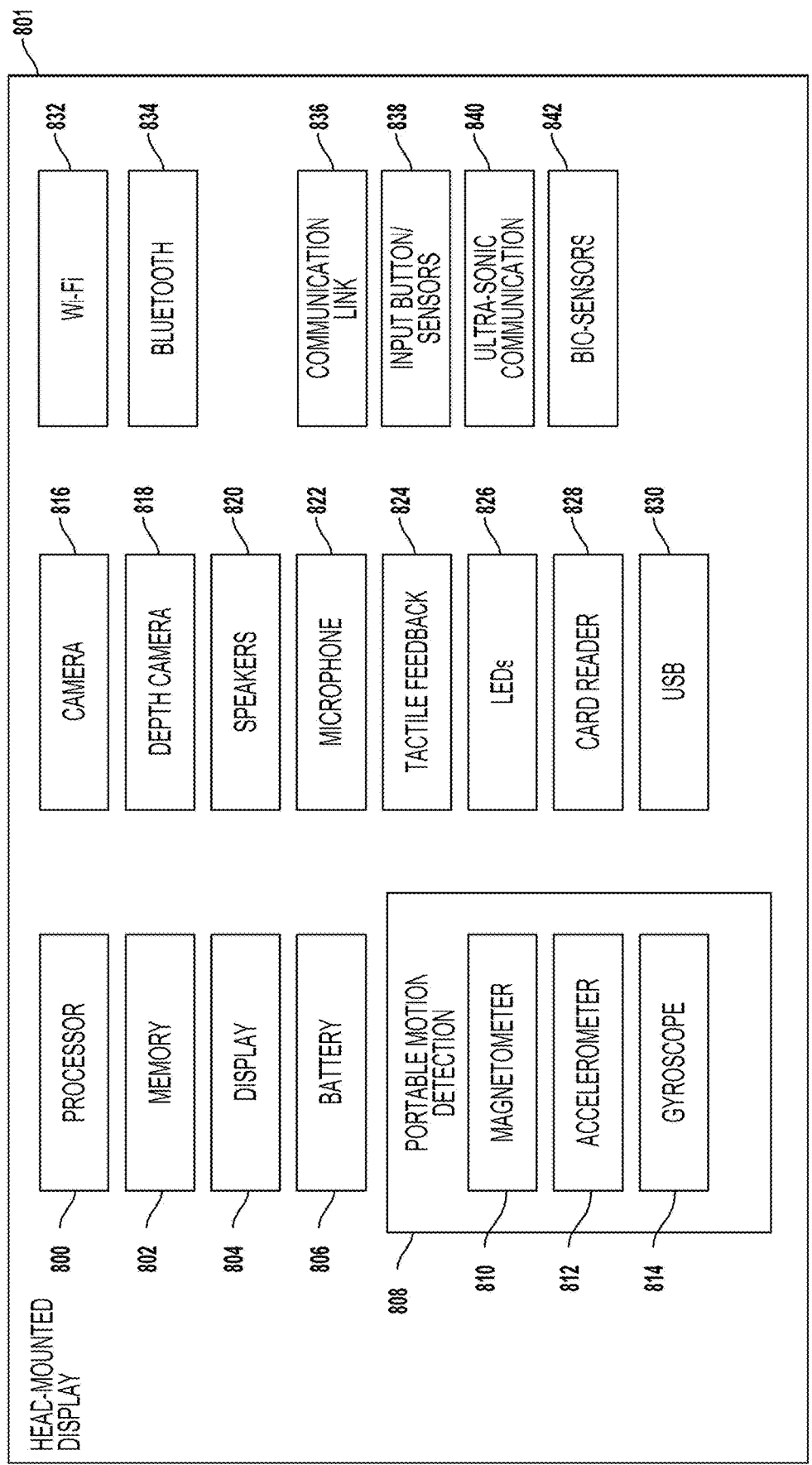
FIG. 8 is a diagram illustrating components of a head-mounted display (HMD), which is an example of the client device of FIG. 1A.

With reference to FIG. 8, a diagram illustrating components of an HMD 801 is shown. The HMD 801 includes a processor 800 for executing program instructions. A memory device 802 (memory device 706 of FIG. 7) is provided for storage purposes. Examples of the memory device 802 include a volatile memory, a non-volatile memory, or a combination thereof. A display device 804 is included which provides a visual interface, e.g., display of image frames generated from save data, etc., that the user (FIG. 1A) views. A battery 806 is provided as a power source for the HMD 801. A motion detection circuit 808 includes any of various kinds of motion sensitive hardware, such as a magnetometer 810, an accelerometer 812, and a gyroscope 814.

An accelerometer is a device for measuring acceleration and gravity induced reaction forces. Single and multiple axis models are available to detect magnitude and direction of the acceleration in different directions. The accelerometer is used to sense inclination, vibration, and shock. In one embodiment, three accelerometers 812 are used to provide the direction of gravity, which gives an absolute reference for two angles, e.g., world-space pitch and world-space roll, etc.

A magnetometer measures strength and direction of a magnetic field in a vicinity of the HMD 801. In some embodiments, three magnetometers 810 are used within the HMD 801, ensuring an absolute reference for the world-space yaw angle. In various embodiments, the magnetometer is designed to span the earth magnetic field, which is ±80 microtesla. Magnetometers are affected by metal, and provide a yaw measurement that is monotonic with actual yaw. In some embodiments, a magnetic field is warped due to metal in the real-world environment, which causes a warp in the yaw measurement. In various embodiments, this warp is calibrated using information from other sensors, e.g., the gyroscope 814, a camera 816, etc. In one embodiment, the accelerometer 812 is used together with magnetometer 810 to obtain the inclination and azimuth of the HMD 801.

A gyroscope is a device for measuring or maintaining orientation, based on the principles of angular momentum. In one embodiment, instead of the gyroscope 814, three gyroscopes provide information about movement across the respective axis (X, Y, and Z) based on inertial sensing. The gyroscopes help in detecting fast rotations. However, the gyroscopes, in some embodiments, drift overtime without the existence of an absolute reference. This triggers resetting the gyroscopes periodically, which can be done using other available information, such as positional/orientation determination based on visual tracking of an object, accelerometer, magnetometer, etc.

The camera 816 is provided for capturing images and image streams of a real-world environment, e.g., room, cabin, natural environment, etc., surrounding the user A. In various embodiments, more than one camera is included in the HMD 801, including a camera that is rear-facing, e.g., directed away from the user A when the user A is viewing the display of the HMD 801, etc., and a camera that is front-facing, e.g., directed towards the user A when the user A is viewing the display of the HMD 801, etc. Additionally, in several embodiments, a depth camera 818 is included in the HMD 801 for sensing depth information of objects in the real-world environment.

The HMD 801 includes speakers 820 for providing audio output. Also, a microphone 822 is included, in some embodiments, for capturing audio from the real-world environment, including sounds from an ambient environment, and speech made by the user A, etc. The HMD 801 includes a tactile feedback circuit 824, e.g., a vibration device, etc., for providing tactile feedback to the user A. In one embodiment, the tactile feedback circuit 824 is capable of causing movement and/or vibration of the HMD 801 to provide tactile feedback to the user A.

LEDs 826 are provided as visual indicators of statuses of the HMD 801. For example, an LED may indicate battery level, power on, etc. A card reader 828 is provided to enable the HMD 801 to read and write information to and from a memory card. A USB interface 830 is included as one example of an interface for enabling connection of peripheral devices, or connection to other devices, such as other portable devices, computers, etc. In various embodiments of the HMD 801, any of various kinds of interfaces may be included to enable greater connectivity of the HMD 801.

A Wi-Fi™ circuit 832 is included for enabling connection to the Internet via wireless networking technologies. Also, the HMD 801 includes a Bluetooth™ circuit 834 for enabling wireless connection to other devices. A communications link 8136 is also included, in some embodiments, for connection to other devices. In one embodiment, the communications link 836 utilizes infrared transmission for wireless communication. In other embodiments, the communications link 836 utilizes any of various wireless or wired transmission protocols for communication with other devices.

Input buttons/sensors 838 are included to provide an input interface for the user A (FIG. 1). Any of various kinds of input interfaces are included, such as buttons, touchpad, joystick, trackball, etc. An ultra-sonic communication circuit 840 is included, in various embodiments, in the HMD 801 for facilitating communication with other devices via ultra-sonic technologies.

Bio-sensors 842 are included to enable detection of physiological data from the user A or B. In one embodiment, the bio-sensors 842 include one or more dry electrodes for detecting bio-electric signals of the user A or B through the user's skin.

The foregoing components of HMD 801 have been described as merely exemplary components that may be included in HMD 801. In various embodiments, the HMD 801 include or do not include some of the various aforementioned components.

In some embodiments, communication between the server system and the client devices may be facilitated using wireless technologies. Such technologies may include, for example, 5G wireless communication technologies. 5G is the fifth generation of cellular network technology. 5G networks are digital cellular networks, in which the service area covered by providers is divided into small geographical areas called cells. Analog signals representing sounds and images are digitized in the telephone, converted by an analog-to-digital converter and transmitted as a stream of bits. All the 5G wireless devices in a cell communicate by radio waves with a local antenna array and low power automated transceiver (transmitter and receiver) in the cell, over frequency channels assigned by the transceiver from a pool of frequencies that are reused in other cells. The local antennas are connected with the telephone network and the Internet by a high bandwidth optical fiber or wireless backhaul connection. As in other cell networks, a mobile device crossing from one cell to another is automatically transferred to the new cell. It should be understood that 5G networks are just an example type of communication network, and embodiments of the disclosure may utilize earlier generation wireless or wired communication, as well as later generation wired or wireless technologies that come after 5G.

It should be noted that in various embodiments, one or more features of some embodiments described herein are combined with one or more features of one or more of remaining embodiments described herein.

Embodiments described in the present disclosure may be practiced with various computer system configurations including hand-held devices, microprocessor systems, microprocessor-based or programmable consumer electronics, minicomputers, mainframe computers and the like. In one implementation, the embodiments described in the present disclosure are practiced in distributed computing environments where tasks are performed by remote processing devices that are linked through a wire-based or wireless network.

With the above embodiments in mind, it should be understood that, in one implementation, the embodiments described in the present disclosure employ various computer-implemented operations involving data stored in computer systems. These operations are those requiring physical manipulation of physical quantities. Any of the operations described herein that form part of the embodiments described in the present disclosure are useful machine operations. Some embodiments described in the present disclosure also relate to a device or an apparatus for performing these operations. The apparatus is specially constructed for the required purpose, or the apparatus is a general-purpose computer selectively activated or configured by a computer program stored in the computer. In particular, in one embodiment, various general-purpose machines are used with computer programs written in accordance with the teachings herein, or it may be more convenient to construct a more specialized apparatus to perform the required operations.

In an implementation, some embodiments described in the present disclosure are embodied as computer-readable code on a computer-readable medium. The computer-readable medium is any data storage device that stores data, which is thereafter read by a computer system. Examples of the computer-readable medium include a hard drive, a network-attached storage (NAS), a ROM, a RAM, a compact disc ROM (CD-ROM), a CD-recordable (CD-R), a CD-rewritable (CD-RW), a magnetic tape, an optical data storage device, a non-optical data storage device, etc. As an example, a computer-readable medium includes computer-readable tangible medium distributed over a network-coupled computer system so that the computer-readable code is stored and executed in a distributed fashion.

Moreover, although some of the above-described embodiments are described with respect to a gaming environment, in some embodiments, instead of a game, other environments, e.g., a video conferencing environment, etc., is used.

Although the method operations were described in a specific order, it should be understood that other housekeeping operations may be performed in between operations, or operations may be adjusted so that they occur at slightly different times, or may be distributed in a system which allows the occurrence of the processing operations at various intervals associated with the processing, as long as the processing of the overlay operations are performed in the desired way.

Although the foregoing embodiments described in the present disclosure have been described in some detail for purposes of clarity of understanding, it will be apparent that certain changes and modifications can be practiced within the scope of the appended claims. Accordingly, the present embodiments are to be considered as illustrative and not restrictive, and the embodiments are not to be limited to the details given herein, but may be modified within the scope and equivalents of the appended claims.

The invention claimed is:

1. A method, comprising:
   receiving content of an interactive application for rendering on a display screen of a pair of augmented reality (AR) glasses worn by a user, the pair of AR glasses used to view real world space in vicinity of the user simultaneously with the content of the interactive application, the content being provided by the interactive application in response to inputs provided by the user and one or more other users during interaction with the interactive application, the content including virtual objects;
   dynamically scaling the virtual objects of the content of the interactive application to match to a scale of real world objects in the real world space viewed through the pair of AR glasses, wherein the dynamic scaling is performed by a machine learning algorithm by obtaining scanned images of the real world space and analyzing the scanned images to determine scale of the real world objects, in response to receiving content of the interactive application for rendering, the dynamic scaling of the virtual objects performed in accordance to the scale of the real world objects determined using the scanned images of the real world space; and
   presenting the virtual objects of the content of the interactive application dynamically scaled as an overlay over the real world objects of the real world space viewed through the pair of AR glasses, the scaled interactive content providing a normalized view of the interactive content when viewed alongside the real world objects, for the user.

2. The method of claim 1, wherein dynamically scaling further includes,
   analyzing the scanned images to identify a layout of the real world objects in the real world space and to determine attributes of the real world objects, the attributes used to determine the scale of the real world objects in the real world space as viewed through the pair of AR glasses; and
   generating images of the virtual objects included in the content of the interactive application for projecting over the real world objects as overlay, the images of the virtual objects dynamically adjusted to match the scale of the virtual objects to the scale of the real world objects in the real world space as viewed through the pair of AR glasses prior to projecting as the overlay over the real world objects.

3. The method of claim 2, wherein the scanned images are received from a scanner in response to a first signal,
   wherein the images of the virtual objects are dynamically adjusted using a projector in response to a second signal, and
   wherein the first signal and the second signal are triggered by the machine learning algorithm in response to receiving content of the interactive application for rendering, the machine learning algorithm analyzing the scanned images received in response to the first signal and generating the second signal to project the images, dynamically adjusted, over the real world objects.

4. The method of claim 2, wherein the attributes of a real world object determined from analyzing the scanned images include at least a position in the real world space, orientation in relation to another real world object, orientation in relation to the user interacting in the real world space, size of the real world object, and rendering distance of the real world object when viewed through the pair of AR glasses.

5. The method of claim 1, wherein presenting the content dynamically scaled further includes,
   filtering out one or more virtual objects from the content prior to rendering the scaled interactive content, the filtering enabling viewing of the scaled interactive content alongside the real world space through the pair of AR glasses.

6. The method of claim 1, wherein presenting the content dynamically scaled includes providing a visual indicator to the virtual objects to indicate presence of the virtual objects included in the overlay.

7. The method of claim 1, wherein the dynamic scaling further includes scaling sound emanating from one or more virtual objects included in the content of the interactive application, the dynamic scaling of the sound performed based on context of the content of the interactive application.

8. The method of claim 1, wherein the interactive application is a video game played between a first player and second player who are remotely located, and wherein the content is gameplay content.

9. The method of claim 8, wherein the dynamic scaling includes scaling the gameplay content in accordance to context of a first set of real world objects in first real world space of the first player prior to overlaying the gameplay content over the first set of real world objects viewed through a first pair of AR glasses of the first player, and scaling the gameplay content in accordance to context of a second set of real world objects in second real world space of the second player prior to overlaying the gameplay content over the second set of real world objects viewed through a second pair of AR glasses of the second player.

10. The method of claim 8, further includes detecting a first selection of a first real world object from a first real world space in vicinity of the first player for inclusion as a first virtual object, and a second selection of a second real world object from a second real world space in vicinity of the second player for inclusion as a second virtual object,
wherein dynamic scaling includes scaling dimensions of the first virtual object and the second virtual object to match to the scale of the virtual objects of the content of the interactive application presented in the overlay, and
wherein the first selection is initiated by the first player and the second selection is initiated by the second player.

11. The method of claim 10, wherein presenting content dynamically scaled includes,
including the first virtual object in the overlay rendered over the first real world space viewed via a first pair of AR glasses of the first player and including the second virtual object in the overlay rendered over the second real world space viewed via a second pair of AR glasses of the second player, the first and the second virtual objects rendered alongside the content of the interactive application, and the dynamic scaling normalizing view of the selected first virtual object to the first real world space and the selected second virtual object to the second real world space.

12. The method of claim 8, further includes,
detecting a first selection of a first real world object from a first real world space in vicinity of a first player for sharing with a second player, the first real world object is rendered as a first virtual object when rendered in the overlay of the content of the interactive application over the second real world space,
wherein dynamic scaling includes scaling dimensions of the first virtual object to match to the scale of the real world objects in the second real world space viewed by the second player, and
wherein the first real world object is selected for sharing by the first player.

13. The method of claim 1, wherein the dynamic scaling is done in response to a signal from a server executing the interactive application, or the interactive application, or a machine learning algorithm.

14. A non-transitory, computer readable storage medium containing a computer program comprising computer executable instructions adapted to cause a computer system to perform a method of presenting content, comprising the steps of:
receiving content of an interactive application for rendering on a display screen of a pair of augmented reality (AR) glasses worn by a user, the pair of AR glasses used to view real world space in vicinity of the user simultaneously with the content of the interactive application, the content being provided by the interactive application in response to inputs provided by the user and one or more other users during interaction with the interactive application, the content including virtual objects;
dynamically scaling the virtual objects of the content of the interactive application to match to a scale of real world objects in the real world space viewed through the pair of AR glasses, wherein the dynamic scaling is performed by a machine learning algorithm by obtaining scanned images of the real world space and analyzing the scanned images to determine scale of the real world objects, in response to receiving content of the interactive application for rendering, the dynamic scaling of the virtual objects performed in accordance to the scale of the real world objects determined using the scanned images of the real world space; and
presenting the virtual objects of the content of the interactive application dynamically scaled as an overlay over the real world objects of the real world space viewed through the pair of AR glasses, the scaled interactive content providing a normalized view of the interactive content when viewed alongside the real world objects, for the user.

15. The non-transitory computer readable storage medium of claim 14, wherein dynamically scaling further includes,
analyzing the scanned images to identify a layout of the real world objects in the real world space and to determine attributes of the real world objects, the attributes used to determine the scale of the real world objects in the real world space as viewed through the pair of AR glasses; and
generating images of the virtual objects included in the content of the interactive application for projecting over the real world objects as overlay, the images of the virtual objects dynamically adjusted to match the scale of the virtual objects to the scale of the real world objects in the real world space as viewed through the pair of AR glasses prior to projecting as the overlay over the real world objects.

16. The non-transitory computer readable storage medium of claim 15, wherein the scanned images are received from a scanner in response to a first signal,
wherein the images of the virtual objects are dynamically adjusted using a projector in response to a second signal, and
wherein the first signal and the second signal are triggered by the machine learning algorithm in response to receiving content of the interactive application for rendering, the machine learning algorithm analyzing the scanned images received in response to the first signal and generating the second signal to project the images, dynamically adjusted, over the real world objects.

17. The non-transitory computer readable storage medium of claim 15, wherein the attributes of a real world object determined from analyzing the scanned images include at least a position in the real world space, orientation in relation to another real world object, orientation in relation to the user interacting in the real world space, size of the real world object, and rendering distance of the real world object when viewed through the pair of AR glasses.

18. A system comprising:

one or more processors configured to:

receive content of an interactive application for rendering on a display screen of a pair of augmented reality (AR) glasses worn by a user, the pair of AR glasses used to view real world space in vicinity of the user simultaneously with the content of the interactive application, the content being provided by the interactive application in response to inputs provided by the user and one or more other users during interaction with the interactive application, the content including virtual objects;

dynamically scale the virtual objects of the content of the interactive application to match to a scale of real world objects in the real world space viewed through the pair of AR glasses, wherein the dynamic scaling is performed by a machine learning algorithm by obtaining scanned images of the real world space and analyzing the scanned images to determine scale of the real world objects, in response to receiving content of the interactive application for rendering, the dynamic scaling of the virtual objects performed in accordance to the scale of the real world objects determined using the scanned images of the real world space; and present the virtual objects of the content of the interactive application dynamically scaled as an overlay over the real world objects of the real world space viewed through the pair of AR glasses, the scaled interactive content providing a normalized view of the interactive content when viewed alongside the real world objects, for the user.

19. The system of claim 18, wherein dynamically scaling further includes, analyzing the scanned images to identify a layout of the real world objects in the real world space and to determine attributes of the real world objects, the attributes used to determine the scale of the real world objects in the real world space as viewed through the pair of AR glasses; and generating images of the virtual objects included in the content of the interactive application for projecting over the real world objects as overlay, the images of the virtual objects dynamically adjusted to match the scale of the virtual objects to the scale of the real world objects in the real world space as viewed through the pair of AR glasses prior to projecting as the overlay over the real world objects.

20. The system of claim 19, wherein the scanned images are received from a scanner in response to a first signal, wherein the images of the virtual objects are dynamically adjusted using a projector in response to a second signal, and wherein the first signal and the second signal are triggered by the machine learning algorithm in response to receiving content of the interactive application for rendering, the machine learning algorithm analyzing the scanned images received in response to the first signal and generating the second signal to project the images, dynamically adjusted, over the real world objects.

* * * * *